(12) United States Patent
DeAngelis et al.

(10) Patent No.: US 9,081,076 B2
(45) Date of Patent: Jul. 14, 2015

(54) SYSTEM AND METHOD FOR OBJECT TRACKING ANTI-JITTER FILTERING

(71) Applicant: IsoLynx, LLC, Haverhill, MA (US)

(72) Inventors: Douglas J. DeAngelis, Harrisville, NH (US); Gerard M. Reilly, Newton, MA (US); Kirk M. Sigel, Ithaca, NY (US); Edward G. Evansen, Walpole, MA (US)

(73) Assignee: Isolynx, LLC, Haverhill, MA (US)

( * ) Notice: Subject to any disclaimer, the term of this patent is extended or adjusted under 35 U.S.C. 154(b) by 300 days.

(21) Appl. No.: 13/674,747

(22) Filed: Nov. 12, 2012

(65) Prior Publication Data

US 2014/0132452 A1   May 15, 2014

(51) Int. Cl.
*A63B 24/00*    (2006.01)
*G01S 5/00*    (2006.01)
*G01S 5/02*    (2010.01)

(52) U.S. Cl.
CPC ............. *G01S 5/0018* (2013.01); *G01S 5/0294* (2013.01); *A63B 2024/0025* (2013.01)

(58) Field of Classification Search
CPC .................... G01S 5/0294; A63B 2024/0025
USPC ......................................................... 702/150
See application file for complete search history.

(56) References Cited

U.S. PATENT DOCUMENTS

| | | | |
|---|---|---|---|
| 6,456,239 B1* | 9/2002 | Werb et al. | .................... 342/463 |
| 7,511,604 B2 | 3/2009 | Raphaeli et al. | |
| 8,169,319 B2 | 5/2012 | Kaplan et al. | |
| 8,705,671 B2 | 4/2014 | Ameti et al. | |
| 8,768,343 B2 | 7/2014 | Wisherd | |
| 8,786,495 B2 | 7/2014 | Wisherd et al. | |
| 8,842,002 B2 | 9/2014 | Rado | |
| 2009/0079580 A1 | 3/2009 | Kaplan et al. | |
| 2010/0172543 A1* | 7/2010 | Winkler | ...................... 382/104 |
| 2012/0188129 A1 | 7/2012 | Ameti et al. | |
| 2012/0225676 A1 | 9/2012 | Boyd et al. | |
| 2015/0002337 A1 | 1/2015 | Wisherd et al. | |

* cited by examiner

*Primary Examiner* — Phuong Huynh
(74) *Attorney, Agent, or Firm* — Lathrop & Gage LLP

(57) ABSTRACT

Object tracking anti-jitter filtering systems and methods. A plurality of raw location points for a tracking tag attached to a tracked object is received. The raw location points are stored within a raw location points buffer. Raw location points within an averaging window are averaged to generate an averaged location point. The averaged location point is stored within an averaged location points buffer for use within the object tracking system.

18 Claims, 13 Drawing Sheets

SYSTEM AND METHOD FOR OBJECT TRACKING ANTI-JITTER FILTERING

BACKGROUND

Individual tags are attached to players and are programmed for a specific reporting rate, such as 25 Hz (i.e. 40 ms/pt). Location information is received from the tag every 40 ms and used within a location tracking system to calculate a raw location point for the tracked object each 40 ms. Where multiple tags are used, these raw location points are calculated for each tag. The location tracking system then filters the raw location points to generate location data for the tracked object at a uniform rate (typically 100 ms).

Raw location points are filtered using a fixed-time moving average filter that has a moving average filter period of 500 ms. Thus, every 100 ms, which is the output period, the location tracking system calculates a "time corrected" moving average of raw location points for the last 500 ms. Where everything is working correctly and raw locations points are calculated at 25 Hz (i.e., each 40 ms), the filter calculates the moving average for 12 or 13 raw location points (500 ms filter period/40 ms per raw location point) to generate the location data.

However, these raw location points may be missed for a variety of reasons (e.g., physical blocking of wireless transmissions from the tag, variations in tag orientation, etc). The moving average that is calculated by the filter is "time corrected," where each raw location point is weighted according to its arrival time. Thus, when one (or more) raw location point is missed, the calculated moving average value is effectively calculated for a different delay period. This affects the delay of the filter.

In the above example using the 500 ms moving average filter, there is a 250 ms filter delay (i.e., half the filter width) for the output location data. That is, each calculated moving average value defines the location of the tag 250 ms in the past. Provided that this delay is constant, it is handled within the location tracking system. However, the "time corrected" aspect of the moving average calculation maintains this fixed filter delay even in the face of some missing 40 ms raw data points, thereby introducing error into the location data.

The standard filter described above operates satisfactorily in normal operation but has shortcomings in certain sport-specific cases. In football for example, each player has at least one tag for tracking location. When the players line up before the start of each play, a series of specific conditions may arise.

For one, the players are substantially stationary, and when providing a "zoomed in" graphic representation of the location data of these players, any minor perturbation (noise) in the location data becomes more visible and more apparent than when the player is moving.

Alternatively, some of the players are closely crowded together, which causes more blocking of radio transmissions from the tags, and thereby more missing raw location points as well as slightly less accuracy for raw location points that are received by the location tracking system.

Additionally, many players may be leaning over, which changes the orientation of the tags, which are typically attached to the shoulders of the players. This change in orientation typically results in more raw location points being missed by the location tracking system as well as slightly less accuracy for raw location points that are received by the location tracking system.

SUMMARY OF THE INVENTION

An Anti-Jitter Filter improves object tracking and graphical display representations of the tracked objects. The Anti-Jitter filter is a system of inter-related filtering algorithms that work together to improve the quality and accuracy of location data determined from the tracked objects. Each of the filtering algorithms improves quality aspects (e.g. reduces noise) of the location data, but also have the potential of introducing unwanted artifacts (e.g. loss of responsiveness, sudden jumps) to a graphical display based upon the location data. The system of inter-related algorithms cooperates to provide improvement to the quality of the location data while minimizing the unwanted artifacts, even when significant gaps and erratic values (i.e., noise) occur in the received raw location points.

Filtering is dynamically modified to improve tracking (a) at slow speed, (b) when raw data is sporadic, and (c) when accuracy is reduced, (d) at slow speed and where there are gaps in the raw data, and (e) where there are multiple tracking tags attached to the same tracked object.

At low speeds (a), problems with tracking data are visibly more apparent. However, the opportunities to use more aggressive filtering are greater. For example, when a tracked player is not moving, a period of the location filter may be increased because the associated increase in filter delay is not visible. That is, if the tracked player is stationary then the determined location 250 ms ago is the same as it was 500 ms ago, thus an increased filter delay is not significant to the output location.

When raw data is sporadic (b) due to blocking of the wireless signal from the tag for example, standard filtering techniques are less effective since there are fewer received points to average over the filter's averaging window. For example, for a filter using a 500 ms averaging period, rather than averaging twelve 40 ms points, only one or two points may have been received during that period. By modifying the desired points required for averaging within the filter, filtering of sporadic data is improved.

When accuracy is reduced (c), the location error of each received raw data point increases, for example when players are leaning over, additional averaging is desired to compensate for the increased location error.

In cases with slow player movement and longer data gaps (d), increasing the averaging period results in visible artifacts as the filter delays vary. In those cases, rather than reporting an overly averaged value by expanding the filter period around the data gap, it's preferable and generally more accurate to predict the player's current position by projecting their last known motion in a straight line, until the raw data resumes again.

When players are each wearing multiple tags (e), the reported position of the player is the average of locations reported by each of the individual tags. If an athlete has a tag on each shoulder and one of those tags is blocked, the reported position will shift by half the distance between the tags.

In one embodiment, an object tracking anti-jitter filtering method receives, within an object tracking system, a plurality of raw location points for a tracking tag attached to a tracked object. The raw location points are stored within a raw location points buffer. Raw location points within an averaging window are averaged to generate an averaged location point that is stored within an averaged location points buffer for use within the object tracking system.

In another embodiment, an object tracking anti-jitter filtering system has at least one processor, memory coupled with the processor for storing raw location points of a tracked object, and an averaging filter, comprising machine readable instructions stored within the memory and executed by the processor, for averaging a plurality of the raw location points within an averaging window to generate an averaged location point having reduced jitter when compared to raw location points of the tracked object.

DETAILED DESCRIPTION OF THE EMBODIMENTS

In the following examples, the rate (e.g., 25 hz) of determining raw location points and the rate (e.g., 10 hz) of determined average location points are exemplary and other rates may be used without departing from the scope hereof. In particular, rates, speed thresholds, adjustments, and timeouts are selected based upon the objects being tracked and the application for which the tracking information is provided. Further, although simple averaging of raw location points is illustrated, other processing of raw location points may be applied without departing from the scope hereof. For example, one or more of weighted averaging, linear interpolation, piecewise interpolation, polynomial interpolation, and curve fitting, or other projection techniques may be used to process raw location points.

Figure 1:
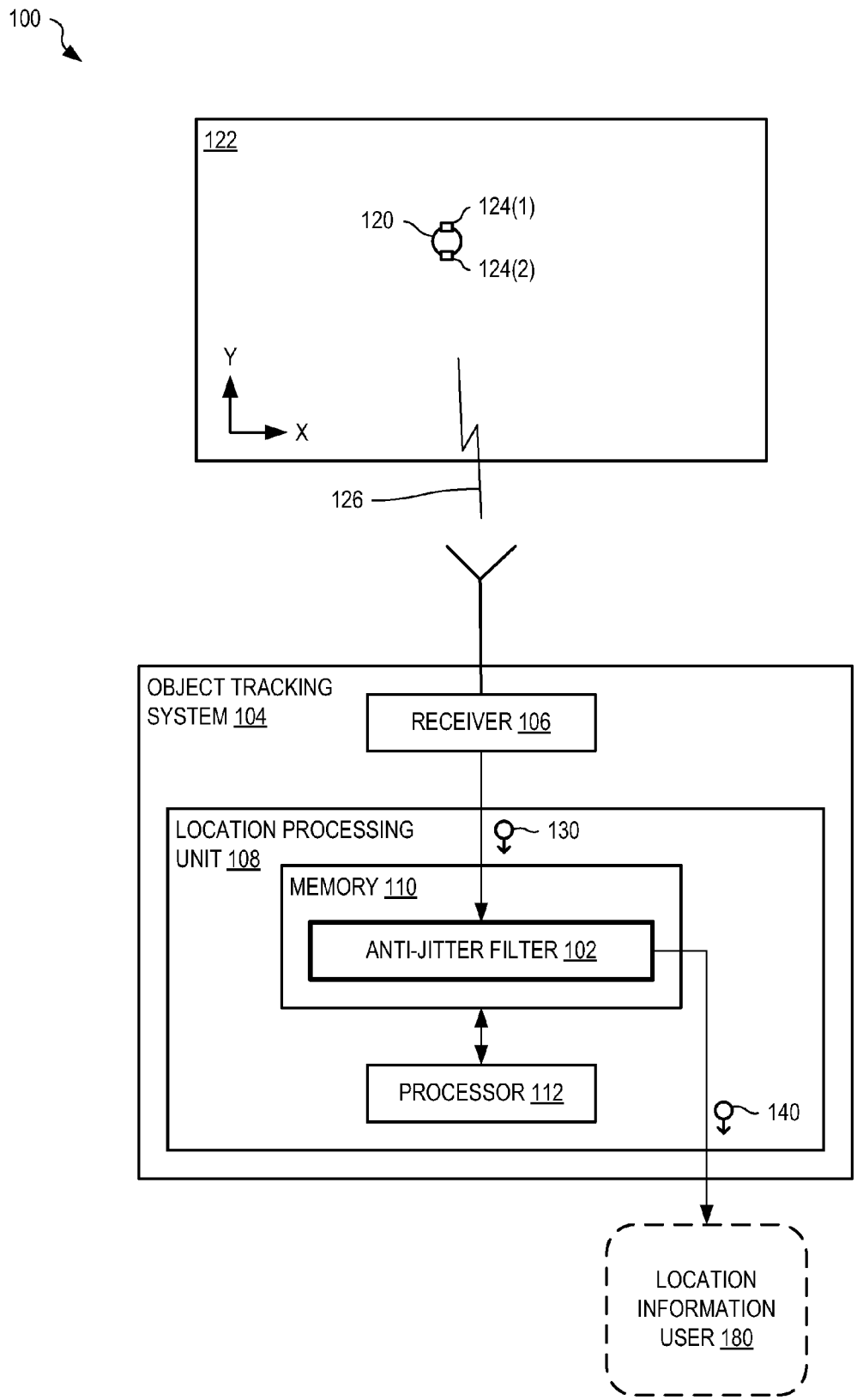
FIG. 1 shows one exemplary object tracking anti-jitter filter employed within an object tracking system that tracks movement of objects within an operational field, in an embodiment.

FIG. 1 shows one exemplary object tracking anti-jitter filter 102 employed within an object tracking system 104 that tracks movement of objects 120 within an operational field 122. At least one tracking tag 124 is attached to each object 120 and each tracking tag 124 periodically (e.g., once every 40 ms) sends a wireless signal 126 to a receiver 106 within object tracking system 104. In one embodiment, each tag 124 periodically determines a raw location point 130 that defines its location within operational field 122 and transmits raw location point 130 to receiver 106 over wireless signal 126. In another embodiment, receiver 106 periodically determines raw location point 130 for each tracking tag 124 based upon wireless signal 126 (e.g., using triangulation). Other methods for determining raw location points 130 may be used without departing from the scope hereof.

Receiver 106 sends raw location points 130 to a location processing unit 108 within object tracking system 104 for further processing. Location processing unit 108 is computer based and includes a processor 112 communicatively coupled to memory 110. Memory 110 is implemented as one or more of RAM, ROM, FLASH, magnetic storage (e.g., hard drive), and optical storage. Anti-jitter filter 102 is implemented, at least in part, as software that includes machine readable instructions stored within memory 110 and executed by processor 112 to adaptively filter raw location points 130 and generate improved location data 140.

Improved location data 140 is output for use by other systems, illustratively shown as a location information user 180. Location information user 180 is for example a graphical image generator that generates a graphical image based, at least in part, upon the improved location data 140. In one example, location information user 180 generates a graphical representation of at least part of operational field 122 illustrating location and movement of tracked objects 120 thereon based upon improved location data 140.

Figure 2:
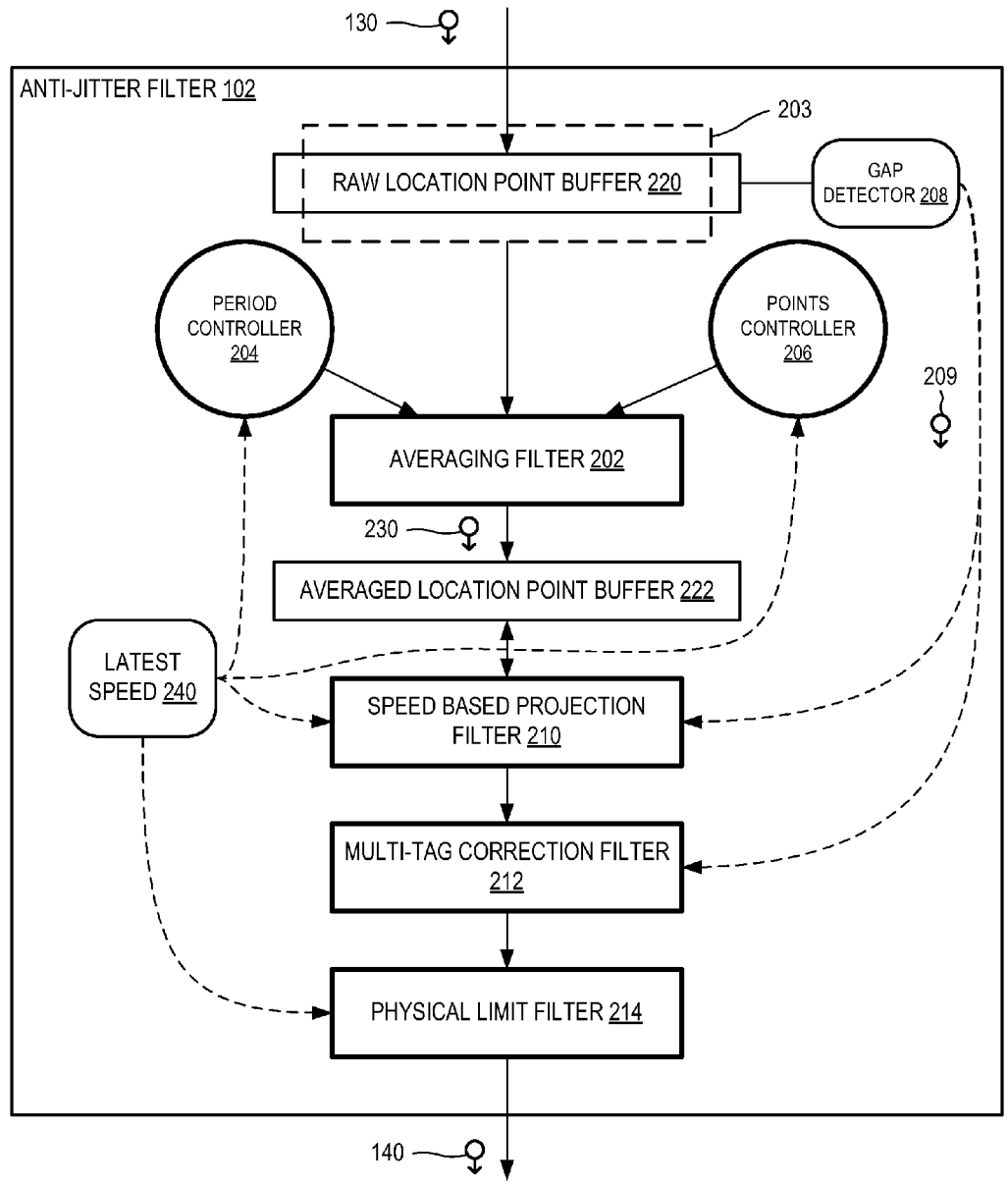
FIG. 2 shows the object tracking anti-jitter filter of FIG. 1 in further detail.

FIG. 2 shows object tracking anti-jitter filter 102 of FIG. 1 in further detail. Anti-jitter filter 102 includes four filtering components: an averaging filter 202 that is controlled by a speed based period controller 204 and a speed based desired points controller 206, an speed based projection filter 210, an multi-tag correction filter 212, and a physical limit filter 214. Speed based period controller 204, speed based desired points controller 206, speed based projection filter 210, multi-tag correction filter 212, and physical limit filter 214 are each implemented as software including machine readable instructions stored within memory 110 and executed by processor 112.

Anti-jitter filter 102 also includes a raw location points buffer 220, an averaged location points buffer 222. Anti-jitter filter 102 may include other components without departing from the scope hereof. For example, anti-jitter filter 102 may include other buffers for storing averaged location points prior to output as improved location data 140.

In one embodiment, raw location points buffer 220 is a single cyclic buffer into which each raw location point 130 is stored when received from receiver 106 of FIG. 1. Raw location points buffer 220 stores raw location points for each tracking tag 124. In another embodiment, raw location points buffer 220 is implemented as a plurality of buffers, where each buffer stores raw location points 130 for a different single tracking tag 124. Where one tracked object 120 is configured with two or more tracking tags 124, buffers for raw location points 130 from these cooperating tracking tags 124 may be processed cooperatively, as described in greater detail below.

Averaging filter 202 implements an averaging window 203 to select a plurality of raw location points 130 within raw location points buffer 220 for processing to generate averaged location points 230 that are for example stored within averaged location points buffer 222. Speed based period controller 204 and speed based points controller 206 cooperate to define the size of averaging window 203 for each tracked object 120. For each tracking tag 124, period controller 204 modifies the length of averaging window 203 based upon, at least in part, the latest speed 240 determined for the associated tracked object 120. For each tracking tag 124, points controller 206 modifies the length of averaging window 203 based upon, at least in part, the latest speed 240 and the number of raw location points 130 within averaging window 203. Points controller 206 increases the size of averaging window 203, to include sufficient points for averaging, as the number of raw location points 130 within averaging window 203 reduces because transmission from the associated tracking tag 124 is lost.

Latest speed 240 is determined for each tracked object 120 and indicates the most recent speed for that object. In one example, latest speed 240 is determined based upon the most recent two improved location data 140 for that tracked object. In another example, latest speed 240 is determined based upon the most recent two averaged location data 230 for that tracked object.

Speed based projection filter 210 operates to fill any missing gaps in the location data by projecting the last known path of the player in a straight line at the latest speed 240, for the duration of the gap. Speed based projection filter 210 is invoked when gap detector 208 detects that transmission from the associated tracking tag 124 is lost for a significant period and speed of the tracked object was greater than a predefined threshold, wherein points controller 206 is unable to increase the size of averaging window 203 sufficiently for example.

Where two or more tracking tags 124 are associated with one tracked object 120 and location of the tracked object is determined by averaging the location of each tracking tag 124, location errors are introduced when raw location points 130 from at least one of the tracking tags are blocked. Multi-tag correction filter 212 compensates for these location errors by correcting for the location error.

Physical limit filter 214 is for example implemented as a final stage of anti-jitter filter 102 and is applied to averaged location points 230 after processing by speed based projection filter 210 and multi-tag correction filter 212. Physical limit filter 214 limits each determined average location point 230 to be within physically possible movement limits of the tracked object 120 relative to its immediately previous average location point 230. For example, maximum speed, maximum acceleration and maximum deceleration characteristics of the tracked object 120 are defined (e.g., for each particular sport that the tracking tags 124 are used to track). If any current average location point 230, relative to the immediately previous average location point, exceeds any of these characteristics, the current average location point is modified to conform to the physical limits characterized.

Speed Based Period Controller

Figure 3:
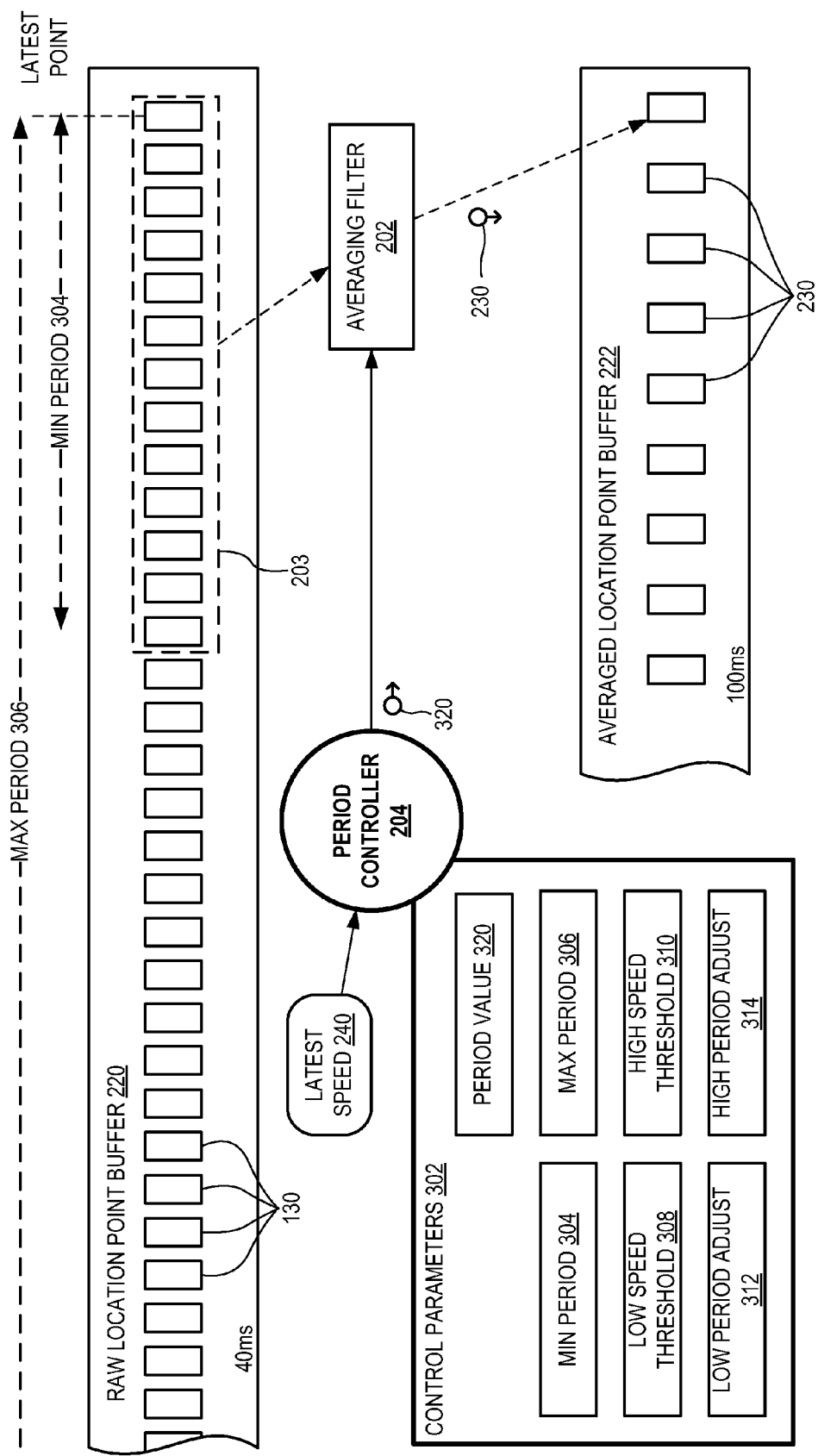
FIG. 3 shows exemplary operation of the speed based period controller of FIG. 2 to control the size of an averaging window to generate averaged location points for one tracking tag.

FIG. 3 shows exemplary operation of speed based period controller 204 to control the period of averaging window 203 to generate averaged location points 230 for a single tracking tag 124. FIG. 3 shows raw location points buffer 220 filled with a plurality of raw location points 130 that are received each forty milliseconds (i.e., at twenty-five hertz). As shown, averaging window 203 is positioned to include the thirteen most recently received raw location points 130 within buffer 220. Period controller 204 is configured with control parameters 302 that include a minimum period 304, a maximum period 306, a low speed threshold 308, a high speed threshold 310, a low period adjust 312, a high period adjust 314, and a period value 320. Period controller 204 controls averaging filter 202 to average raw location points 130 within window 203 to generate averaged location points 230 that are stored within averaged location points buffer 222. Period controller 204 maintains a period value 320 that is sent to averaging filter 202 to define the period of window 203. As shown in FIG. 3, averaged location points 230 are determined and stored at a rate that is different from the rate that raw location points 130 are received. In this example, averaged location points 230 are determined every one-hundred milliseconds (i.e., ten hertz), whereas raw location points 130 are received every forty milliseconds (i.e., 25 Hz). Period controller 204 controls the period of window 203 based upon speed of the tracked object 120 associated with the raw location points 130.

Figure 4:
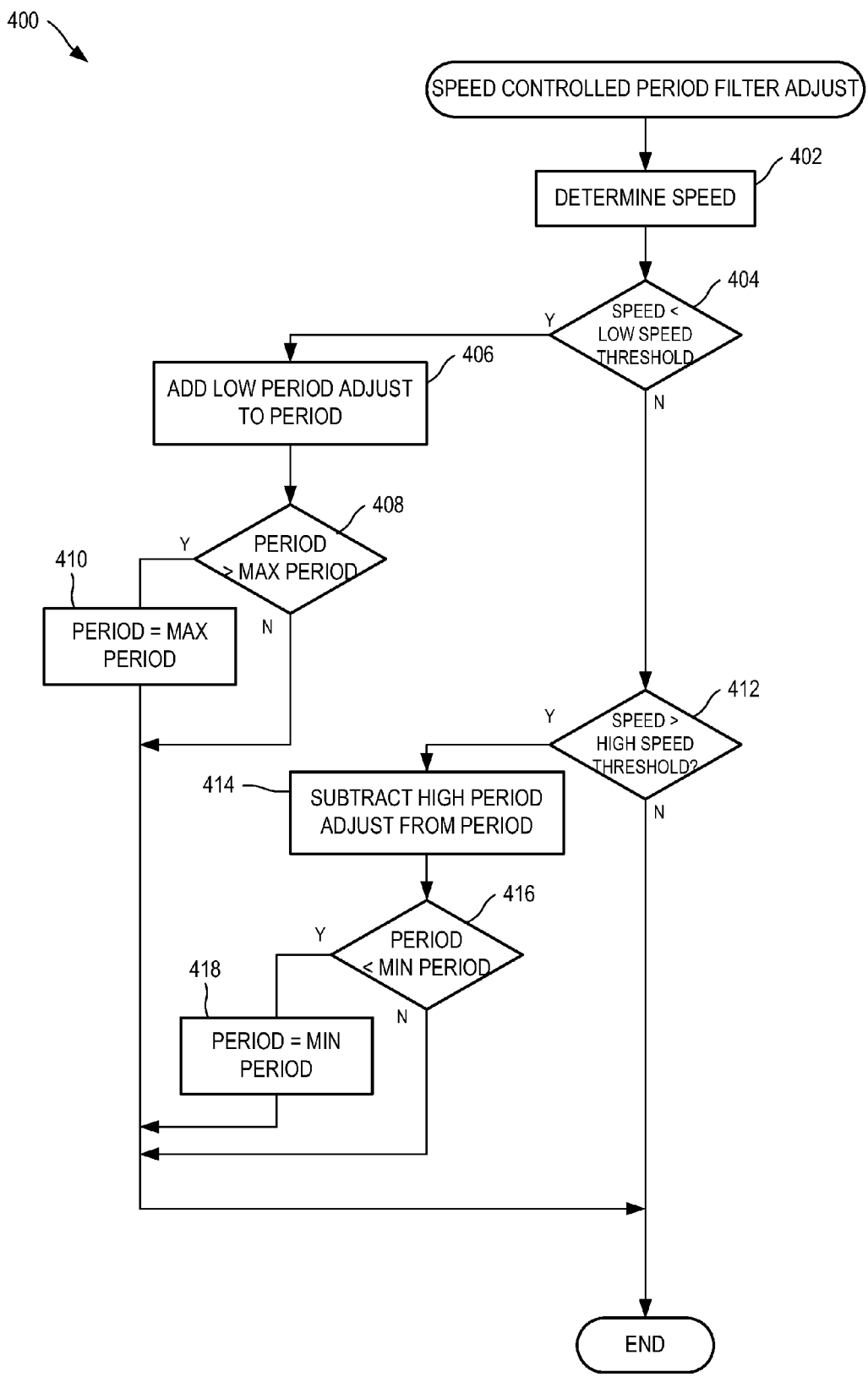
FIG. 4 is a flowchart illustrating one exemplary method for controlling the period of the averaging window of FIG. 3 based upon the most recent speed of the tracked object, in an embodiment.

FIG. 4 is a flowchart illustrating one exemplary method 400 for controlling the period of averaging window 203 based upon latest speed 240 of tracked object 120. Method 400 is implemented within speed based period controller 204 and is invoked prior to generating each averaged location point 230, for example.

In step 402, method 400 determines the latest speed of the tracked object. In one example of step 402, latest speed 240 is determined from two most recently determined averaged location points 230 for tacked object 120. In another example of step 402, latest speed 240 is determined from the most recent improved location data 140 for tracked object 120.

Step 404 is a decision. If, in step 404, method 400 determines that latest speed 240 is less than low speed threshold 308, method 400 continues with step 406; otherwise, method 400 continues with step 412.

In step 406, method 400 adds the low period adjust to the window period value. In one example of step 406, period controller 204 adds low period adjust 312 to period value 320.

Step 408 is a decision. If, in step 408, method 400 determines that the period is greater than the maximum period, method 400 continues with step 410; otherwise method 400 terminates.

In step 410, method sets the period value to the maximum period value. In one example of step 410, period controller 204 sets period value 320 equal to maximum period 306, which has a value of three seconds for example. Method 400 then terminates.

Step 412 is a decision. If, in step 412, method 400 determines that latest speed 240 is greater than high speed threshold 310, method 400 continues with step 414; otherwise method 400 terminates.

In step 414, method 400 subtracts the high period adjust from the period value. In one example of step 414, period controller 204 subtracts high period adjust 314 from period value 320.

Step 416 is a decision. If, in step 416, method 400 determines that period value 320 is less than minimum period 304, method 400 continues with step 418; otherwise method 400 terminates.

In step 418, method 400 sets the period value equal to the minimum period value. In one example of step 418, period controller 204 sets period value 320 equal to minimum period 304. Method 400 then terminates.

FIGS. 3 and 4 are best viewed together with the following description. Period controller 204 utilizes method 400 to modify the size of window 203 by determining period value 320 based upon latest speed 240 and the previous value of period value 320. During normal operation, when tracked object 120 is moving at a speed greater than low speed threshold 308, period value 320 is set to minimum period 304 (e.g., 500 ms). When tracked object 120 slows down to move at a speed less than low speed threshold 308 (e.g., 0.1 m/s), period controller 204 increases period value 320 by low period adjust 312 for each averaged location point 230 generated, until period value 320 reaches maximum period 306 (e.g., 3000 ms). Thus, when tracked object 120 is not moving, or is moving very slowly, the period of window 203 is at maximum period 306 such that averaging filter 202 averages a greater number of raw location points 130 to generate each averaged location point 230, thereby minimizing any jitter within averaged location points 230 that results from errant location values within raw location points 130.

In this example, period controller 204 is configured to increase period value 320 rapidly when tracked object 120 slows to a speed less than low speed threshold 308, and is configured to reduce period value 320 more slowly when tracked object 120 moves at speeds greater than high speed threshold 310. Specifically, low period adjust 312 is set to a value (e.g., 2500 ms) that rapidly changes period value 320 when speed of tracked object 120 is below low speed threshold 308, and high period adjust 314 is set to a smaller value (e.g., 500 ms) than low period adjust 312, such that period value 320 changes less quickly when tracked object 120 has a speed greater than high speed threshold 310. Thus, period controller 204 increases filtering rapidly when tracked object 120 slows and/or stops, and reduces filtering more slowly as tracked object 120 increases speed.

Control parameters 302 are configured based upon the expected activity of tracked objects 120. For example, where tracked objects 120 represent players in an American football game, since the players are often stationary when at the line of scrimmage, any noise in locations reported within raw location points 130 results in perceived jitter of the players' locations. By increasing the size of window 203 when the player is not moving, a greater number of raw location points 130 are averaged, and thus the effect of location noise is reduced.

Configuring period controller 204 to rapidly increase period value 320 from, for example, half a second to three seconds when speed reduces has a disadvantage in that averaged location points 230 may indicate, due to the increase of period value 320, that the tracked object moves backwards. Conversely, if low period adjust 312 is too small, period value 320 takes longer to increase, which results in more perceptible location noise initially when tracked object 120 stops. Thus, low period adjust 312 should be set judiciously to increase period value 320 quickly enough to reduce the effect of location noise without causing unwanted jumps in location resulting from changes in the delay of averaging filter 202.

Similarly, high speed threshold 310 and high speed adjust 314 control the rate at which period value 320 decreases (i.e., the speed at which the averaging filter turns off) when tracked object 120 increases speed. If high period adjust 314 is too large, averaged location points 230 would show the tracked object 120 jumping forwards. Similarly, if high period adjust 314 is too small, averaged location points 230 would indicate that tracked object 120 lags behind actual movement.

In the following example, minimum period 304 has a value of half a second (500 ms), maximum period has a value of three seconds (3000 ms), low speed threshold 308 is one hundred millimeters per second (0.1 m/s), high speed threshold 310 is three-hundred millimeters per second (0.3 m/s), low period adjust 312 is two-and-a-half seconds (2500 ms), and high period adjust 314 is half a second (500 ms). Where speed of tracked object 120 is greater than low speed threshold 308, period controller 204 sets period value 320 to 500 ms. When period controller 204 determines speed of tracked object to drop below low speed threshold 308 (e.g., 0.1 m/s), period controller 204 causes period value 320 to immediately change to 3000 ms, thereby applying maximum filtering immediately. When period controller 204 determines that the speed of tracked object 120 is above 0.3 m/s, period controller 204 decreases period value 320 by 500 ms until it reaches the minimum period 304 of 500 ms.

Table 1 shows exemplary control of period value 320 by period controller 204 as tracked object 120 changes speed, and illustrating the effects of location noise that indicate incorrect speeds.

TABLE 1

EXEMPLARY PERIOD VALUE CONTROL

| Speed m/s | Period ms | Comment |
|---|---|---|
| 2.0 | 500 | Slowing down - filter off |
| 1.0 | 500 | Slowing down |
| 0.5 | 500 | Slowing down |
| 0.2 | 500 | Stationary |
| 0.1 | 3000 | Stationary - Filter on |
| 0.14 | 3000 | Stationary |
| 0.31 | 2500 | Stationary - noise spike - filter turning off |
| 0.35 | 2000 | Stationary - noise spike - filter turning off |
| 0.08 | 3000 | Stationary - filter on |
| 0.22 | 3000 | Stationary |
| 0.11 | 3000 | Stationary |
| 0.28 | 3000 | Stationary |
| 0.35 | 2500 | Speeding Up - filter turning off |
| 1.2 | 2000 | Speeding Up - filter turning off |
| 1.3 | 1500 | Speeding Up - filter turning off |
| 1.8 | 1000 | Speeding Up - filter turning off |
| 2.3 | 500 | Speeding Up - filter off |
| 3.1 | 500 | Speeding Up - filter off |

Advantages of using speed based period controller 204 include (a) improving the perceived quality of averaged location points 230 by increased averaging on all data, and (b) reducing the effects of both (i) missing raw location points 130 and (i) reduced accuracy (location noise) of raw location points 130.

Speed Based Desired Points Controller

Figure 5:
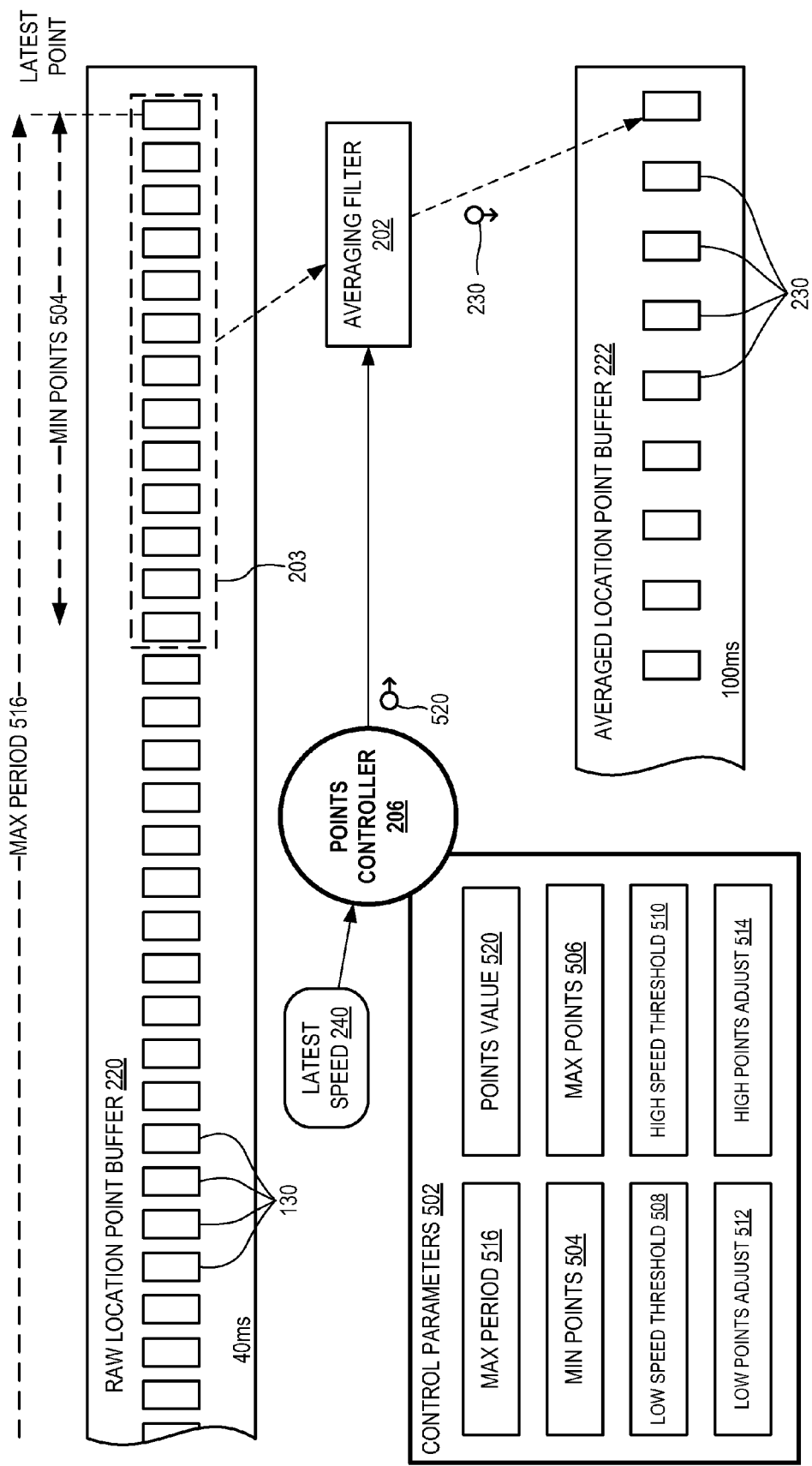
FIG. 5 shows exemplary operation of the speed based desired points controller of FIG. 2 to control the size of the averaging window to generate averaged location points for one tracking tag.

FIG. 5 shows exemplary operation of speed based desired points controller 206 to control the size of averaging window 203 to generate averaged location points 230 for a single tracking tag 124. FIG. 5 is similar to FIG. 3 and shows raw location points buffer 220 filled with a plurality of raw location points 130 that are received each forty milliseconds (i.e., at twenty-five hertz). As shown, averaging window 203 is positioned to include the thirteen most recently received raw location points 130 within buffer 220. Points controller 206 is configured with control parameters 502 that include a minimum points 504, a maximum points 506, a low speed threshold 508, a high speed threshold 510, a low points adjust 512, a high points adjust 514, and a points value 520. Points controller 206 controls averaging filter 202 to average raw location points 130 within window 203 to generate averaged location points 230 that are stored within averaged location points buffer 222. Points controller 206 maintains a points value 520 that is sent to averaging filter 202 to define or adjust the period of window 203. As shown in FIG. 5, averaged location points 230 are determined and stored at a rate that is different from the rate that raw location points 130 are received. In this example, averaged location points 230 are determined every one-hundred milliseconds (i.e., ten hertz), whereas raw location points 130 are received every forty milliseconds (i.e., 25 Hz). Points controller 206 controls the size of window 203 based upon speed of the tracked object associated with the raw location points and a count of raw location points 130 within window 203.

Figure 6:
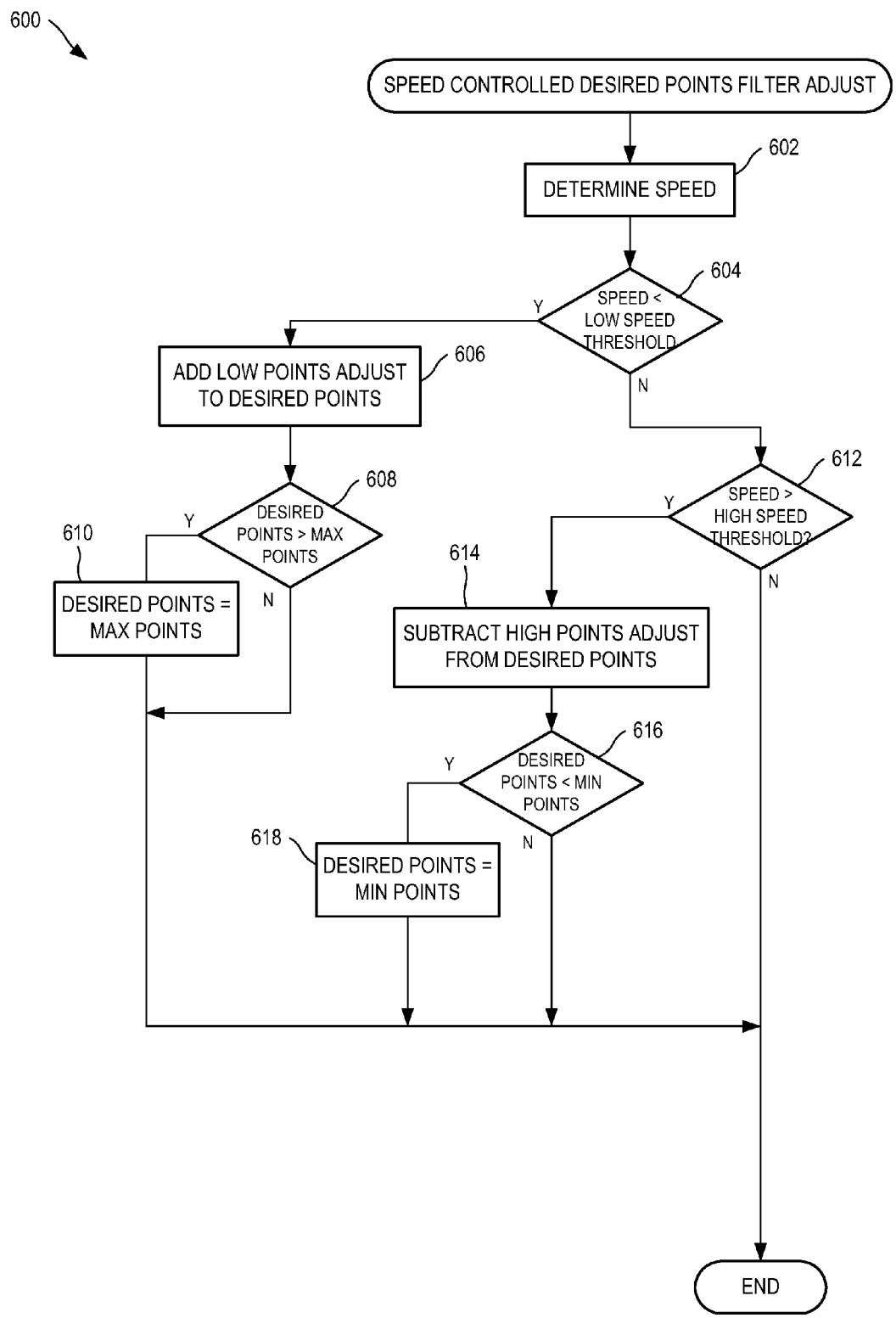
FIG. 6 is a flowchart illustrating one exemplary method for controlling the period of the averaging window based upon (a) the most recent speed of the tracked object, and (b) a number of raw location points within the averaging window, in an embodiment.

FIG. 6 is a flowchart illustrating one exemplary method 600 for controlling the period of window 203 based upon (a) latest speed 240 of tracked object 120, and (b) number of raw location points 130 within window 203. Method 600 is implemented within speed based desired points controller 206 and is invoked prior to generating each averaged location point 230, for example.

In step 602, method 600 determines the latest speed of the tracked object. In one example of step 602, latest speed 240 is determined from two most recently determined averaged location points 230 for tacked object 120. In another example of step 602, latest speed 240 is determined from the most recent improved location data 140 for tracked object 120.

Step 604 is a decision. If, in step 604, method 600 determines that latest speed 240 is less than low speed threshold 508, method 600 continues with step 606; otherwise, method 600 continues with step 612.

In step 606, method 600 adds the low points adjust to the desired points value. In one example of step 606, period controller 204 adds low points adjust 312 to points value 520.

Step 608 is a decision. If, in step 608, method 600 determines that the desired points value 520 is greater than the maximum points 506, method 600 continues with step 610; otherwise method 600 terminates.

In step 610, method 600 sets the desired points value to the maximum desired points value. In one example of step 610, points controller 206 sets points value 520 equal to maximum points 506. Method 600 then terminates.

Step 612 is a decision. If, in step 612, method 600 determines that latest speed 240 is greater than high speed threshold 510, method 600 continues with step 614; otherwise method 600 terminates.

In step 614, method 600 subtracts the high points adjust from the desired points value. In one example of step 614, points controller 206 subtracts high points adjust 514 from points value 520.

Step 616 is a decision. If, in step 616, method 600 determines that points value 520 is less than minimum points 504, method 600 continues with step 618; otherwise method 600 terminates.

In step 618, method 600 sets the points value equal to the minimum points value. In one example of step 618, points controller 206 sets points value 520 equal to minimum points 504. Method 600 then terminates.

FIGS. 5 and 6 are best viewed together with the following description. Points controller 206 utilizes method 600 to define a minimum number of raw location points 130 allowed within averaging window 203 by determining points value 520 based upon latest speed 240 and the previous value of points value 520. As described above, window 203 has a period defined by period controller 204. However, averaging filter 202 may increase the period of window 203 if window 203 does not contain at least desired points value 520 of raw location points 130.

During normal operation, when tracked object 120 is moving at a speed greater than low speed threshold 508, points value 520 is set to minimum points 504 (e.g., 1 point). When tracked object 120 slows down to move at a speed less than low speed threshold 508 (e.g., 0.1 m/s), points controller 206 increases points value 520 by low points adjust 512 for each averaged location point 230 generated, until points value 520 reaches maximum points 506 (e.g., 10 points). Thus, when tracked object 120 is not moving, or is moving very slowly, the points value 520 is set to maximum points 506 such that averaging filter 202 increases, if needed, the period of window 203 to include a quantity of raw location points 130 equivalent to points value 520. By expanding window 203 to include the desired number of points, averaging filter 202 averages a sufficient number of raw location points 130 to generate each averaged location point 230 to minimize any jitter within averaged location points 230 that results from errant location values within raw location points 130.

In one example of operation, tracked object 120 represents a player on an American football field. As the player bends over at the line of scrimmage and is surrounded by other players, operation of tacking tag 124 is often impaired, wherein determined location information often becomes erratic causing large location errors being introduced into a single or few raw location points 130. Often, wireless signals from the tracking devices are blocked altogether, resulting in missing raw location points 130 within raw location points buffer 220. Where tracking tags 124 transmit at a rate of 25 Hz, and the default period of window 203 is 500 ms, averaging filter 202 averages twelve or thirteen raw location points 130 to generate each averaged location point 230. When raw location points 130 are missing (e.g., where transmission from tracking tag 124 is blocked), the number of raw location points 130 within window 203 is reduced, such that the averaged location point 230 becomes more susceptible to the effects of location errors (location noise) within raw location points 130 contained within window 203. This has the effect that location information within averaged location point 230 may become more erratic, even when the location noise within raw location points 130 does not increase.

Speed based desired points controller 206 addresses this problem by defining, based upon determined speed of the tracked object, the minimum, number of raw location points 130 required for averaging. When the number of raw location points 130 within window 203 is less than the desired points value 520, averaging filter 202 increases the period of window 203 (up to a maximum period 516) until window 203 contains points value 520 of raw location points 130.

As compared to operation and effect of speed based period controller 204, speed base desired points controller 206 has the following advantages and disadvantages.

Advantages of using points controller 206 include (a) always averaging the same number of points, so the averaging doesn't get worse with missing raw location points 130, (b) transitions between longer/shorter filtering are generally smoother in more operational cases, and (c) the period of window 203 is only increased when raw location points 130 are missing—with uninterrupted raw location points 130, the filter is effectively off.

In the following example, control parameters 502 are set as follows: minimum points 504 is set to one (1 point), maximum points 506 is set to ten (10 points), low speed threshold 508 is set to 0.6 m/s, low points adjust 512 is set to 5 (five points), high speed threshold 510 is set to 0.8 m/s, and high speed adjust 514 is set to 2 (two points). Maximum period 516 is set to 2000 ms (two seconds), and the default period of window 203 is set to 400 ms.

When tracked object 120 is moving at a speed greater than low speed threshold 508, window 203 is always 400 ms, regardless of whether raw location points 130 are missing, since desired points value 520 is one. When speed of the tracked object is determined to be below low speed threshold 508 (0.3 m/s), points controller 206 increases desired points value 520 by low points adjust 512 (5 points) until it reaches maximum points 506 (10 points). Thus, if tracked object 120 is stopped, any time raw location points 130 are missing, averaging filter 202 increases the period of window 203 to include maximum points 506. Similarly, when tracked object 120 increases speed above high speed threshold 510 (0.8 m/s), points controller 206 decreases desired points value 520 by high points adjust 514 (2 points) until desired points value 520 reaches minimum points 504 (1 point), thereby turning the filter off.

Table 2 shows exemplary changes to desired points value 520 based upon changes in speed of a tracked object.

TABLE 2

TRACKED OBJECT SPEED DATA

| Time | Speed | Comments |
|---|---|---|
| 100 | 2.0 | Desired Points = 1 - slowing down |
| 200 | 1.0 | Desired Points = 1 - slowing down |
| 300 | 0.5 | Desired Points = 5 - filter beginning to be enabled |
| 400 | 0.6 | Desired Points = 10 - filter fully enabled |
| 500 | 0.2 | Desired Points = 10 |
| 600 | 0.3 | Desired Points = 10 |
| 700 | 0.8 | Desired Points = 8 - noise spike - filter turning off |
| 800 | 0.9 | Desired Points = 6 - noise spike - filter turning off |
| 900 | 0.4 | Desired Points = 10 - filter back on |
| 1000 | 0.1 | Desired Points = 10 |
| 1100 | 0.4 | Desired Points = 10 - speeding up |
| 1200 | 0.8 | Desired Points = 8 - speeding up - filter turning off |
| 1300 | 1.1 | Desired Points = 6 - speeding up - filter turning off |
| 1400 | 1.5 | Desired Points = 4 - speeding up - filter turning off |
| 1500 | 2.2 | Desired Points = 2 - speeding up - filter turning off |
| 1600 | 2.3 | Desired Points = 1 - speeding up - filter off |
| 1700 | 2.9 | Desired Points = 1 - speeding up - filter off |

Table 3 shows raw location points 130 received within raw location points buffer 220.

TABLE 3

RAW LOCATION POINTS RECEIVED

| Point No. | Time | Comment |
|---|---|---|
| 1 | 40 | New Point |
| 2 | 80 | New Point |
| 3 | 120 | New Point |
| 4 | 160 | New Point |
| 5 | 200 | New Point |
| 6 | 240 | New Point |
| 7 | 280 | New Point |
| 8 | 320 | New Point |
| 9 | 360 | New Point |
| 10 | 400 | New Point |
| 11 | 440 | New Point |
| 12 | 480 | New Point |
| 13 | 520 | New Point |
| 14 | 560 | New Point |
| 15 | 600 | New Point |
| 16 | 640 | New Point |
|  | 680 | Missing *** |
|  | 720 | Missing *** |
|  | 760 | Missing *** |
|  | 800 | Missing *** |
| 17 | 840 | New Point |
| 18 | 880 | New Point |
| 19 | 920 | New Point |
| 20 | 960 | New Point |
| 21 | 1000 | New Point |
| 22 | 1040 | New Point |
| 23 | 1080 | New Point |
| 24 | 1120 | New Point |
| 25 | 1160 | New Point |
| 26 | 1200 | New Point |
| 27 | 1240 | New Point |
| 28 | 1280 | New Point |
| 29 | 1320 | New Point |
| 30 | 1360 | New Point |
| 31 | 1400 | New Point |

Table 4 shows exemplary adjustment of the period of window 203 based upon raw location points 130 of Table 3.

TABLE 4

PERIOD ADJUSTMENT AND POINTS AVERAGED

| Time | Period | Comment |
|---|---|---|
| T = 400 | Period = 400 | averaging pts #1-10 (see Table 3) |
| T = 500 | Period = 400 | averaging pts #3-12 |
| T = 600 | Period = 400 | averaging pts #6-15 |
| T = 700 | Period = 460 | averaging pts #7-16 - period starts increasing |
| T = 800 | Period = 560 | averaging pts #7-16 |
| T = 900 | Period = 580 | averaging pts #9-18 |
| T = 1000 | Period = 560 | averaging pts #12-21 |
| T = 1100 | Period = 580 | averaging pts #14-23 |
| T = 1200 | Period = 400 | averaging pts #17-26 - period back to normal |
| T = 1300 | Period = 400 | averaging pts #19-28 |
| T = 1400 | Period = 400 | averaging pts #22-31 |

Fixed Delay Correction

For certain uses of anti-jitter filter 102, FIG. 1, it is extremely important to minimize the delay between receipt of raw location points 130 and the output of improved location points 140. However, in many other uses of anti-jitter filter 102, increasing the delay between receipt of raw location points 130 and the output of improved location points 140 does not presents a significant problem, as long as this delay is uniform and known. The introduction of a known fixed delay allows for certain corrections to be incorporated into anti-jitter filter 102, as described below. This fixed delay correction works by introducing the worse case delay (e.g., where window 203 is configured with a maximum period) to the anti-jitter filter at all times. For an averaging filter with a normal averaging period of 500 ms, the delay induced between the received raw location points 130 and the output improved location points 140 is 250 ms (i.e., 500 ms divided by two, since the central point of the averaging window is halfway through the period). Using period controller 204, where maximum period 306 is set to 3000 ms, then the maximum delay resulting from operation of the filter with the maximum period is 1500 ms. Therefore, by imposing a fixed delay of 1500 ms, correction may be made for the varying delay induced when varying the period of the filter. Specifically, as period controller 204 and/or points controller 206 modifies the period of window 203, the fixed delay correction maintains the fixed delay between received raw location points 130 and the output of improved location points 140. Further, where fixed delay correction is employed, period controller 204 and points controller 206 may be used more effectively by turning the filters on and/or off faster without introducing location error in averaged location points 230. It is also possible to use higher levels of filtering (longer periods) without introducing error in averaged location points 230.

Figure 7:
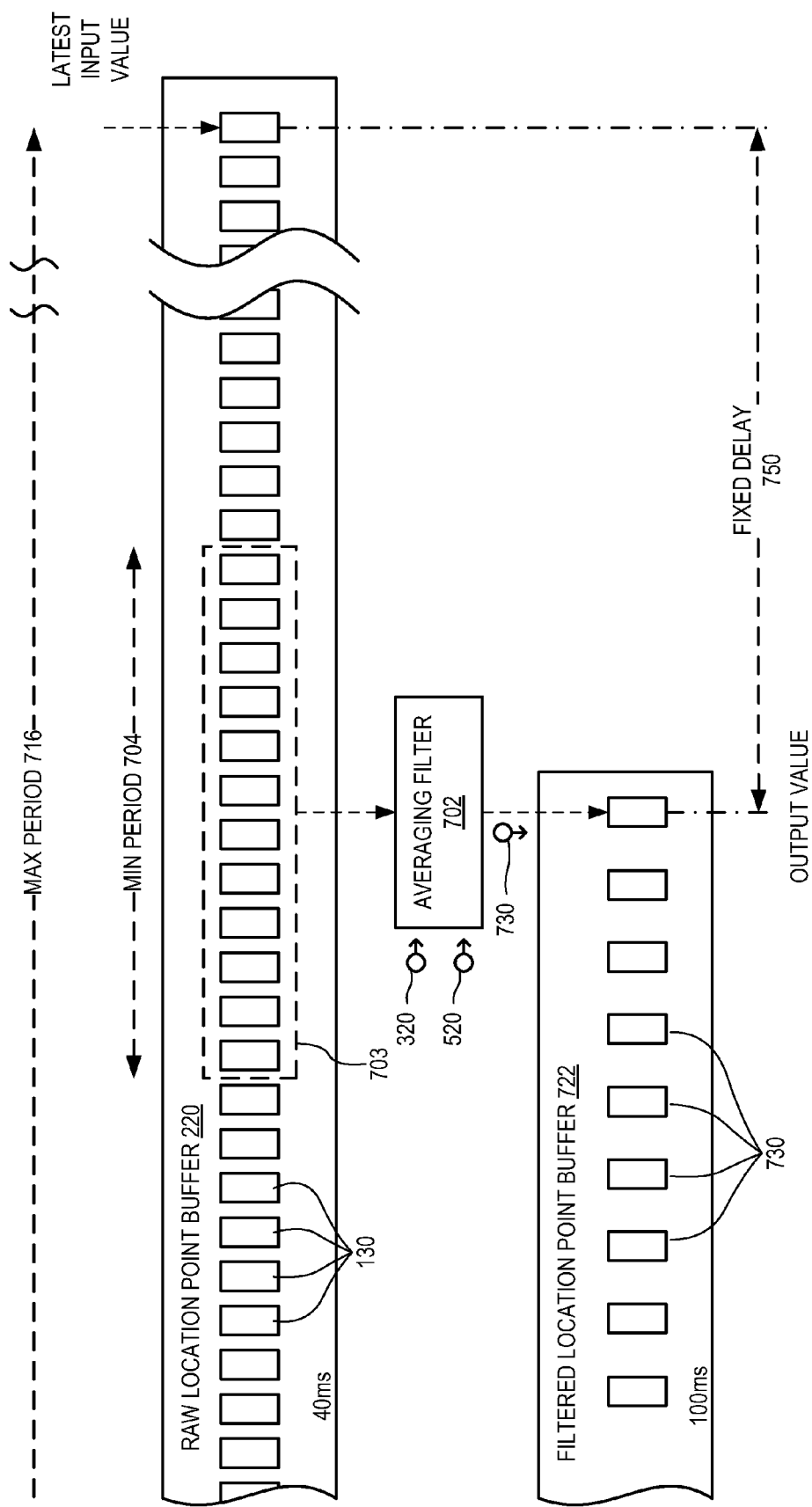
FIG. 7 shows one exemplary configuration for correction for the affects of varying filter delay within an averaging filter when the period of the averaging window is varied, in an embodiment.

FIG. 7 shows one exemplary configuration for correction for the affects of varying filter delay within an averaging filter 702 when the period of averaging window 703 is varied. Averaging filter 702 is similar to averaging filter 202 of FIGS. 3 and 5, except that a central point of averaging window 703 is always positioned at a fixed delay 750 from the most recent raw location point 130. If, for example, fixed delay 750 is three seconds, and the period of window 703 is 500 ms, raw location points 130 within window 703 are aged from 2.75 s-3.25 s.

As shown in FIG. 7, averaging filter 702 receives one or both of period value 320 from period controller 204 and points value 520 from points controller 206. As period value 320 and/or points value 520 increases the period of window 703, averaging filter 702 increases the included raw location points 130 that are both newer and older, thereby maintaining the center of window 703 and thus the average age of raw location points 130 within window 703 at fixed delay 750. Therefore, the age of averaged location point 730, when determined by averaging filter 702, is always fixed delay 750.

Speed Controlled Projection Filter

As described above, points controller 206 and averaging filter 202 cooperate to automatically stretch the period of window 203 further into the past whenever raw location points 130 are missing from raw location points buffer 220. This approach operates well for short gaps in received raw location points 130, but may introduce unwanted location errors in averaged location points 230 for larger gaps, particularly if the tracked object 120 was moving slowly prior to the start of the gap. In particular, speed based projection filter 210 of FIG. 2 estimates a current location of tracked object 120 based upon the most recent location defined within previous average location points 230, and a latest movement vector (i.e., speed and direction) of the tracked object.

Figure 8:
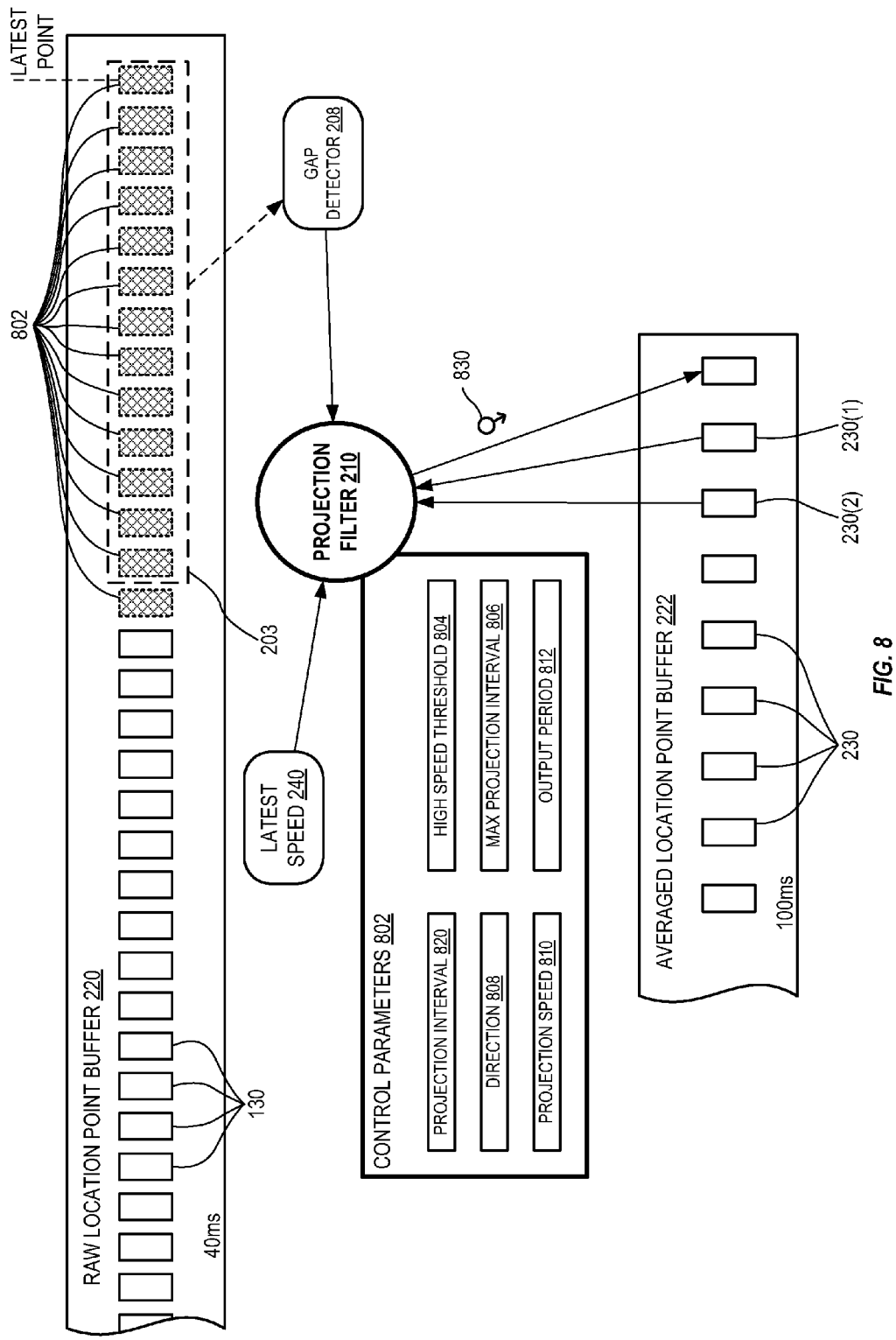
FIG. 8 shows exemplary operation of the speed based projection filter of FIG. 2 to generate a projected location point when raw location points from the tracking tag associated with the tracked object are missing.

FIG. 8 shows exemplary operation of speed based projection filter 210 of FIG. 2, to generate a projected location point 830 when raw location points 130 from tracking tag 124 are missing. When raw location points 130 are missing from raw location points buffer 220 for the period of averaging window 203, projection filter 210 determines a projected location point 830 based upon latest speed 240 and a direction of tracked object 120 if the latest speed of the tracked object is greater than high speed threshold 804. The direction of the tracked object 120 is determined from the most recent two (or more) previously determined location points (e.g., average location points 230) for the tracked object. For example, projection filter 210 determines a direction 808 of tracking tag 124 based upon average location points 230(1) and (2). Then, projection filter 210 uses a projection technique, for example straight-line projection, to generate projected location point 830 based upon direction 808 and latest speed 240. Those skilled in the art will appreciate that one or more of weighted averaging, linear interpolation, piecewise interpolation, polynomial interpolation, and curve fitting, may be implemented by projection filter 210 in lieu of straight-line projection to generate projected location point 830.

Projection filter 210 is enabled and disabled based upon latest speed 240. For example, projection is only performed when the tracked object 120 is moving faster than high speed threshold 804. If there are no significant gaps in raw location points 130, or tracked object 120 is moving relatively slowly, projection filter 210 does not generate projected location points 830. High speed threshold 804 is for example set to 0.8 m/s.

Projection filter 210 uses a maximum projection interval 806 that defines a period for generating projected location points 830 based upon the latest speed, after which projection filter 210 reduces the projection speed used to generate each following projected location point 830 such that location information within averaged location points buffer 222 indicates that tracked object 120 gradually slows and stops unless further raw location points 130 are received. I.e., when raw location points 130 are not received, after maximum projection interval 806, tracked object 120 appears to coast to a stop.

Figure 9:
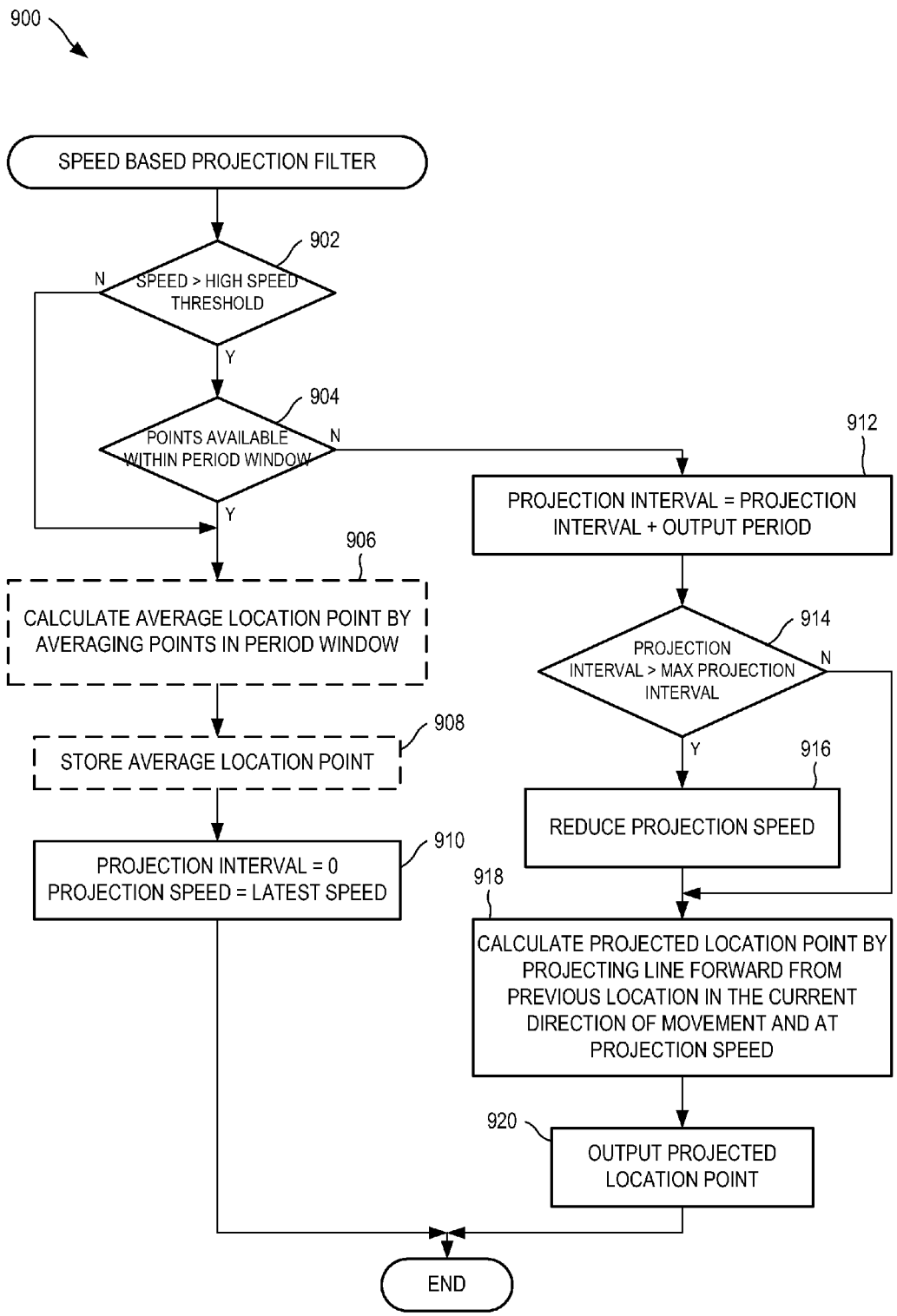
FIG. 9 is a flowchart illustrating one exemplary method for the generating projected location point when raw location points from the tracking tag associated with the tracked object are missing, in an embodiment.

FIG. 9 is a flowchart illustrating one exemplary method 900 for generating projected location point 830 when raw location points 130 from tracking tag 124 associated with the tracked object are missing. Method 900 is invoked for each output period (e.g., 100 ms) of anti-jitter filter 102. Method 900 is for example implemented within speed based projection filter 210. FIGS. 8 and 9 are best viewed together with the following description.

Step 902 is a decision. If, in step 902, method 900 determines that latest speed 240 of tracked object 120 is greater than high speed threshold 804, method 900 continues with step 904; otherwise method 900 continues with step 906.

Step 904 is a decision. If, in step 904, method 900 determines that at least one point is available within period window 203, method 900 continues with step 906; otherwise method 900 continues with step 912. In one example of step 904, gap detector 208 counts the number of raw location points 130 stored within raw location points buffer 220 for the period of window 203.

Steps 906 and 908 represent normal operation of anti-jitter filter 102, where one or both of period controller 204 and points controller 206 control averaging filter 202 to average raw location points 130 within window 203 to generate and store one average location point 130 within averaged location points buffer 222.

In step 910, method 900 sets projection interval to zero, and projection speed to the latest speed of the tracked object. In one example of step 910, projection filter 210 sets projection interval 820 to zero and sets projection speed 810 equal to latest speed 240. Method 900 then terminates.

In step 912, method 900 adds the output period to the projection interval. In one example of step 912, projection filter 210 adds output period 812 to projection interval 820, where output period 812 is 100 ms, which is the period between average location points 230 within averaged location points buffer 222.

Step 914 is a decision. If, in step 914, method 900 determines that projection interval 820 is greater than maximum projection interval 806, method 900 continues with step 916; otherwise method 900 continues with step 918.

In step 916, method 900 reduces the projection speed. In one example of step 916, projection filter 210 subtracts a predefined speed (e.g., 0.2 m/s) from projection speed 810, limiting projection speed 810 at zero.

In step 918, method 900 calculates a projected location by, for example, projecting a line forward from a previous location of the tracked object in a current direction of movement of the tracked object and at the projection speed. In one example of step 918, projection filter 210 calculates direction 808 from average location points 230(1) and (2), and then determines projected location point 830 based upon averaged location point 230(1), direction 808, projection speed 810, and output period 812.

In step 920, method 900 outputs the projected location point. In one example of step 920, projection filter 210 stores projection location point 830 in averaged location points buffer 222. Method 900 then terminates.

In the example of Table 5, tracked object 120 is moving along an X axis of operational field 122 from X-coordinate 4 to X-coordinate 14. Y coordinates are not shown for clarity of illustration. As shown, location information is not determined for points 4 through 14, whereupon projection filter 210 generates reported X coordinate values based upon method 900.

TABLE 5

SPEED BASED PROJECTION FILTER EXAMPLE

| Point # | Tag X | Reported X | Comment |
|---|---|---|---|
| 1 | 4 | 4 | Normal operation |
| 2 | 5 | 5 | |
| 3 | 6 | 6 | |
| 4 | ?? | 7 | missing point, position projected |
| 5 | ?? | 8 | missing point, position projected |
| 6 | ?? | 9 | missing point, position projected |
| 7 | ?? | 10 | missing point, position projected |
| 8 | ?? | 11 | missing point, position projected |
| 9 | ?? | 11.8 | maximum projection interval exceeded, slowing down |
| 10 | ?? | 12.4 | maximum projection interval exceeded, slowing down |
| 11 | ?? | 12.8 | maximum projection interval exceeded, slowing down |
| 12 | ?? | 13 | maximum projection interval exceeded, slowing down |
| 13 | ?? | 13 | maximum projection interval exceeded, stopped |
| 14 | ?? | 13 | maximum projection interval exceeded, stopped |
| 15 | 14 | 14 | data from tag resumed |

As shown in the example of Table 5, information from tag 124 is blocked at point 4, and projection filter 210 generates a reported X value of 7, showing that tag 124 is assumed to continue in a straight line and at a constant speed. At point 9, maximum projection interval 806 is exceeded and projection filter 210 reduces projection speed 810 such that the estimated distance the tracked object is assumed to have moved is reduced. Projection speed 810 is further reduced for points 10 through 12, and is zero for points 13 and 14, where the tracked object is assumed to have stopped. At point 14, information from tag 124 is no longer blocked, and normal operation resumes to determine that tracked object 120 is at X location 14.

Advantages of projection filter 210 include (a) that it handles moving tracked objects well, (b) that it avoids issues that arise with period controller 204, points controller 206, and averaging filter 202 when handling extended periods of missing raw location points 130.

Multiple Tag Correction Filter

As shown in FIG. 1, tracked object 120 may be configured with two tracking tags 124(1) and 124(2). As described above, raw location points 130 from each tag 124 are processed by anti-jitter filter 102 to determine averaged location points 230 for each tracking tag 124. Object tracking system 104 may determine an orientation of the tracked object 120 based upon averaged location points 230 of at least two tracking tags 124 configured with tracked object 120. Object tracking system 104 may also determine an object location point of the tracked object based upon an average (or other position based calculation) of these averaged location points 230. That is, even where tracked object 120 has two or more tracking tags 124, object tracking system 104 may determine one location for the tracked object.

In one example, where object tracking system 104 is used to track players in an American football game, tracked object 120 represents one player that has two tracking tags 124(1)-(2), one positioned on each shoulder for example. Orientation of tracked object 120 (i.e., the player) is determined based upon physical separation of tags 124(1) and (2) and their determined locations. Position of tracked object 120 is calculated by averaging locations received from both tags 124(1) and (2), or by other calculations where tags 124 are not positioned symmetrically on tracked object 120. However, where raw location points 130 from one of these tags becomes blocked, the determined location of tracked object 120 is based only upon information received from the other tracking tag 124. When signals from one tag 124 are blocked and unblocked, unless multi-tag correction is used, the tracked object appears to move based upon the distance between the blocked tag and the averaged distance between all tags on the tracked object. Continuing with the example of the American football player with two tags 124(1) and (2), the introduced location error when one tag is blocked is half the distance between the two tags. If the tags are positioned one meter apart, any time one tag is blocked, the reported position would shift by ½ meter towards the non-blocked tag. Similarly, when the tag is no-longer blocked, the reported position would shift by ½ meter back to the average distance between the two tags.

Multi-tag correction filter 212 uses knowledge of the relationship between position of each tag 124 relative to one another and relative to the tracked object 120 to automatically correct for these errors as one or more tags 124 are blocked and become unblocked provided that orientation of the tracked object is know (or can be assumed).

Orientation of the tracked object 120 may be determined in many ways. Where raw location points 130 are received from at least two tags 124 associated with tracked object 120, an angle of tracked object 120 relative to operational field 122 for example, may be determined (e.g., as perpendicular to the line formed between the two locations reported from tags 124). Where two tags 124 are each located on a different shoulder of the player, knowledge of which tag is on which shoulder allows object tracking system 104 to also determine the orientation of the player.

While raw location points 130 are received from at least two tags 124 associated with tracked object 120, orientation of the tracked object is determined and stored. When one tag is blocked, multi-tag correction filter 212 assumes that tracked object 120 is still in the last determined orientation, and then applies a correction to the determined object location based upon the last determined orientation, tag orientation, and tag separation. For example, where two tags 124 are associated with tracked object 120 and one tag is blocked, the determined position is shifted by half the distance between the tags in the direction of the blocked tag.

In another embodiment, one or more of tags 124 include one or more sensors (e.g., gyroscope, magnetic, etc.) for determining and reporting orientation of the tag relative to operational field 122. As noted above, multi-tag correction filter 212 may operate with more than two tags, provided that parameters define the orientation and spacing of tags relative to each other. For example, multi-tag correction filter 212 may correct location of the tracked object when two or more tags are blocked.

Figure 10:
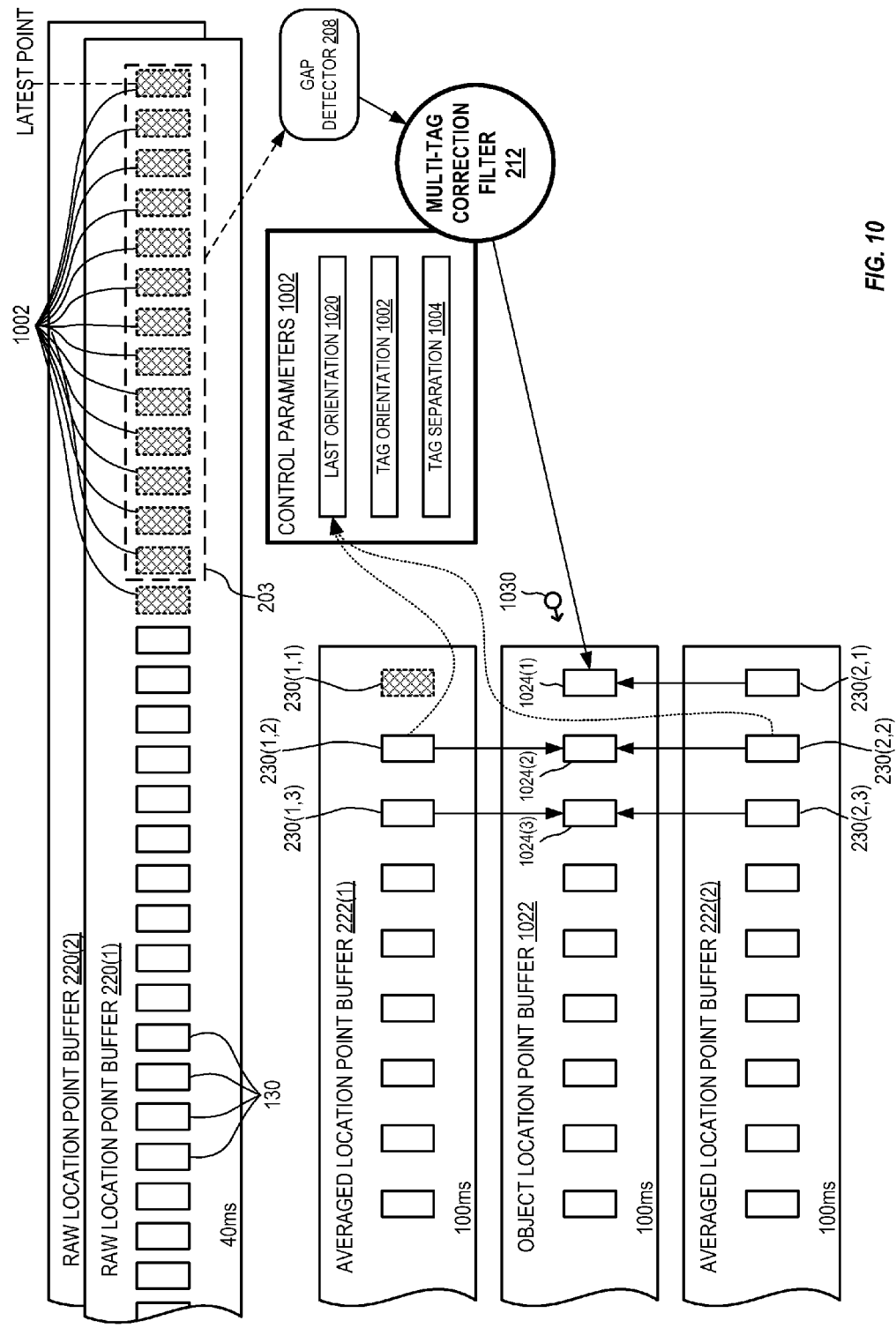
FIG. 10 shows exemplary operation of the multi-tag correction filter of FIG. 2 to correct the object location stored within an object location buffer when raw location points are blocked from one of two tracking tags associated with the tracked object.

FIG. 10 shows exemplary operation of multi-tag correction filter 212 to correct object location point 1024(1) within object location points buffer 1022 when raw location points 130 are blocked from one of two tags 124 associated with tracked object 120.

In the example of FIG. 10, raw location points buffer 220(1) stores raw location points 130 received for tracking tag 124(1) and raw location points buffer 220(2) stores raw location points 130 received for tracking tag 124(2). As described above, raw location points 130 within raw location points buffer 220(1) are processed to generate and store averaged location points 230 within averaged location points buffer 222(1), and raw location points 130 within raw location points buffer 220(2) are processed to generate and store averaged location points 230 within averaged location points buffer 222(2). In turn, averaged location points 230 of buffer 222(1) are averaged with average location points 230 of buffer 222(2) to generate and store object location point 1024 within object location points buffer 1022. In particular, locations defined within averaged location points 230(1,3) and 230(2,3) are averaged to generate object location point 1024(3); locations defined within averaged location points 230(1,2) and 230(2,2) are averaged to generate object location point 1024(2); and so on. However, in the example of FIG. 10, averaged location point 230(1,1) is missing because raw location points 130 were not received from tag 124(1), and thus object location point 1024(1) is equal to averaged location point 230(2,1).

Multi-tag correction filter 212, upon notification that point 230(1,1) is missing (e.g., from gap detector 208), automatically determines a correction 1030, based upon last orientation 1020, tag orientation 1002, and tag separation 1004, and adds the correction 1030 to point 1024(1) to correct for the error induced by missing point 230(1,1).

Figure 11:
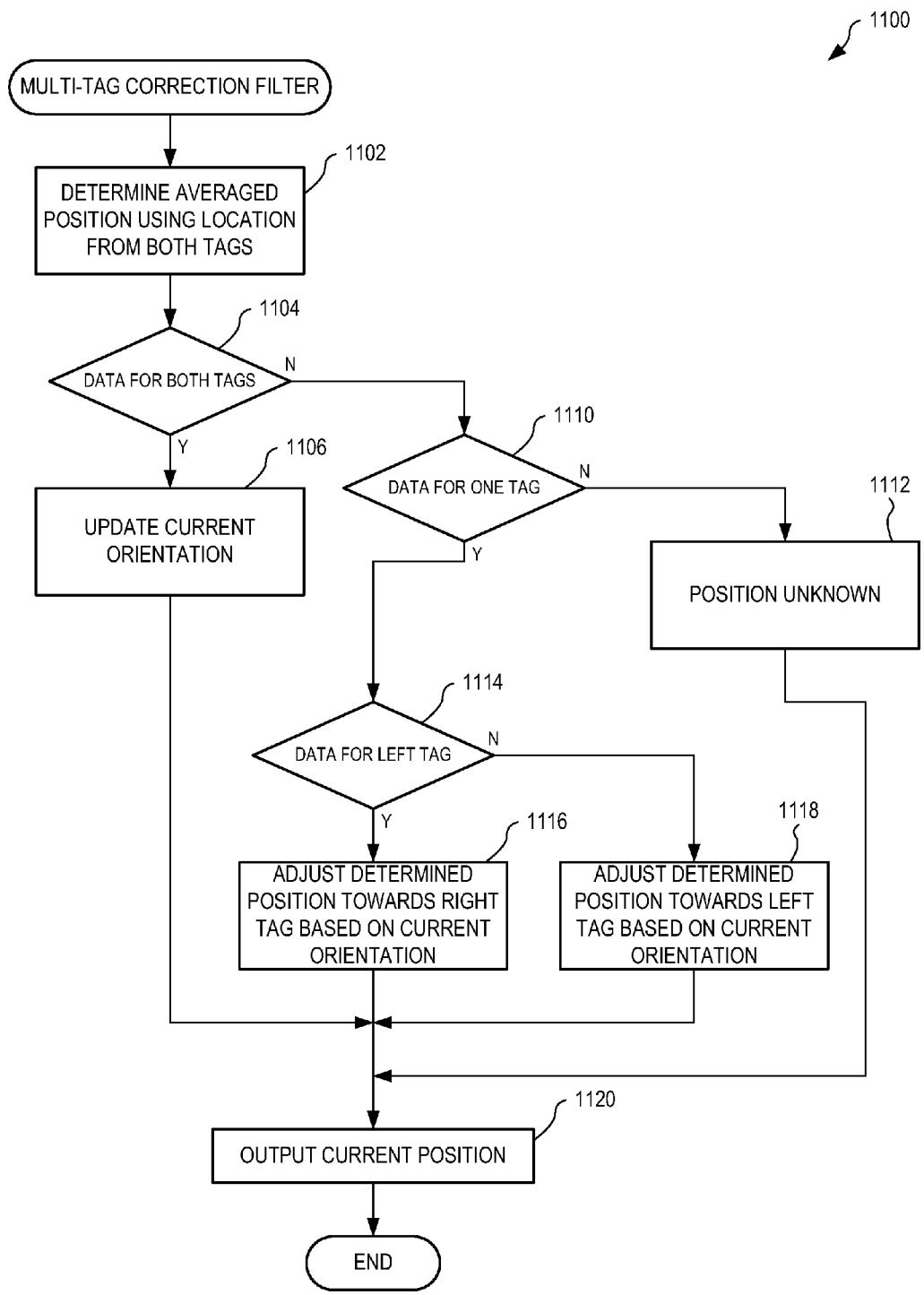
FIG. 11 is a flowchart illustrating one exemplary method for correcting a determined object location of a tracked object when location information from one of two or more tags attached to the tracked object is blocked, in an embodiment.

FIG. 11 is a flowchart illustrating one exemplary method 1100 for correcting a determined location of a tracked object when location information from one of two or more tags attached to the tracked object is blocked. Method shows operation where tracked object 120 has two tracking tags 124 associated therewith. However, method 1100 may easily adapt to correct location for tracked objects with more than two tags. Method 1100 is for example implemented within multi-tag correction filter 212 and invoked for each generated object location point 1024.

In step 1102, method 1100 creates an object location based upon averaging average location points for both tags associated with the tracked object. In one example of step 1102, multi-tag correction filter 212 generates object location point 1024(1) by averaging averaged location points 230(1,1) and 230(2,1).

Step 1104 is a decision. If, in step 1104, method 1100 determines that averaged location points 230 are received for both tags 124, method 1100 continues with step 1106; otherwise method 1100 continues with step 1110.

In step 1106, method 1100 determines and stores the current orientation. In one example of step 1106, multi-tag correction filter 212 determines last orientation 1020 based upon locations defined within averaged location point 230(1,1) and averaged location point 230(2,1). Method 1100 then continues with step 1120.

Step 1110 is a decision. If, in step 1110, method 1100 determines that one averaged location point 230 is available for one of the two tags 124, method 1100 continues with step 1114; otherwise method 1100 continues with step 1112.

In step 1112, method 1100 defines the current position as unknown. Method 1100 then continues with step 1120.

Step 1114 is a decision. If, in step 1114, method 1100 determines that the averaged location point 230 is received for the left tag 124, method 1100 continues with step 1116; otherwise method 1100 continues with step 1118.

In step 1116, method 1100 adjusts the determined position towards the right tag based upon current orientation and distance between tags. In one example of step 1116, multi-tag correction filter 212 generates correction 1030 to correct object location point 1024(1) based upon last orientation 1020, tag orientation 1002, and tag separation 1004. Method 1100 then continues with step 1120.

In step 1118, method 1100 adjusts the determined position towards the left tag based upon current orientation and distance between tags. In one example of step 1116, multi-tag correction filter 212 generates correction 1030 to correct object location point 1024(1) based upon last orientation 1020, tag orientation 1002, and tag separation 1004. Method 1100 then continues with step 1120.

In step 1120, method 1100 outputs the current position. In one example of step 1120, multi-tag correction filter 212 stores the updated location in object location point buffer 1022. Method 1100 then terminates.

Physical Limit Filter

Figure 12:
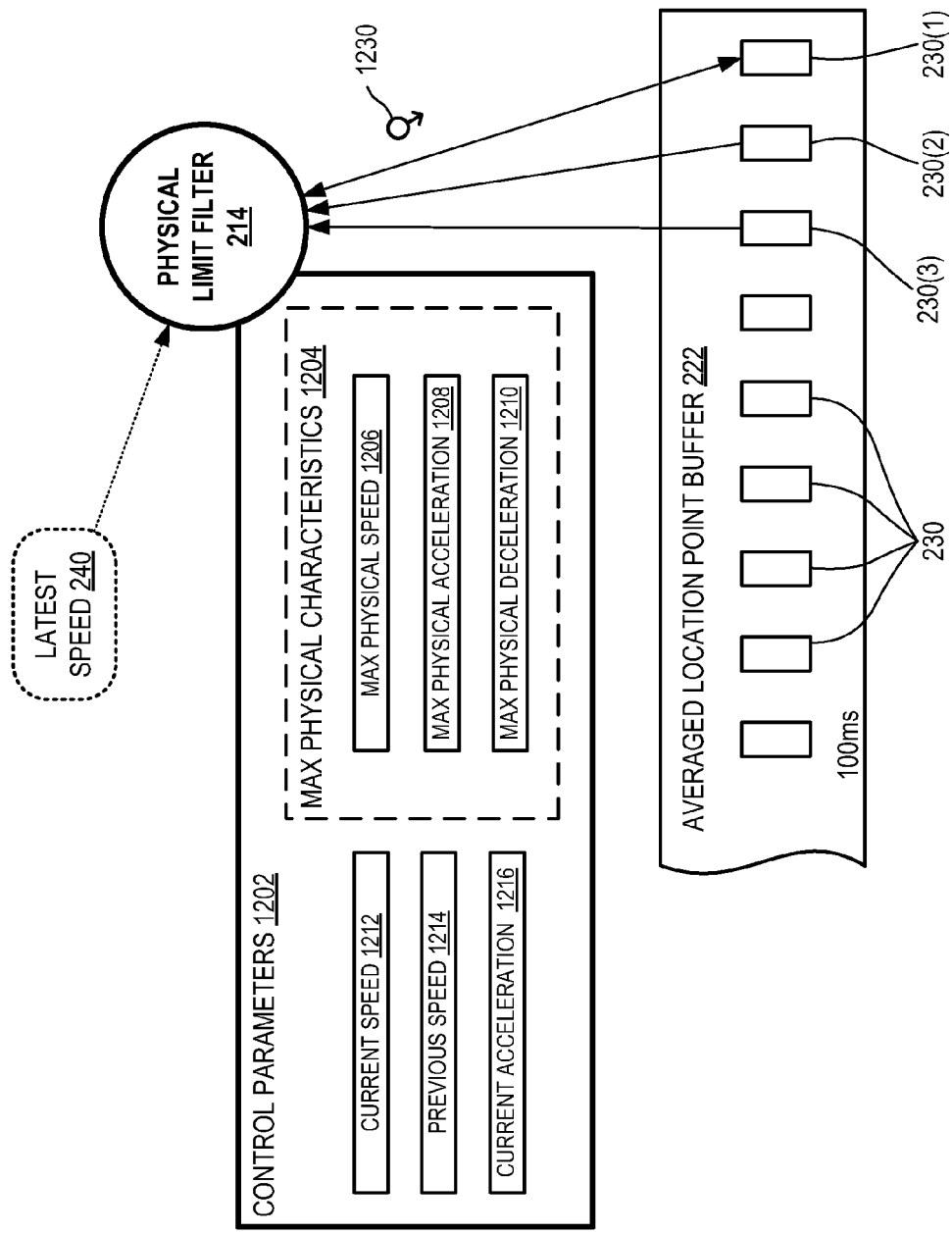
FIG. 12 shows exemplary operation of the physical limit filter of FIG. 2 to limit the averaged location points based upon maximum physical characteristics of the tracked object.

FIG. 12 shows exemplary operation of physical limit filter 214 to limit averaged location points 230 based upon maximum physical characteristics 1204 of tracked object 120. Physical limit filter 214 operates to limit the most recently generated averaged location point 230 within averaged location points buffer 222 based upon current speed 1212, current acceleration 1216, and maximum physical characteristics 1204 of tracked object 120 by modifying the most recently generated averaged location point 230 to be a location achievable based upon maximum physical characteristics 1204.

Maximum physical characteristics 1204, included within control parameters 1202 of physical limit filter 214, specify a maximum physical speed 1206, a maximum physical acceleration 1208 and a maximum physical deceleration 1210 of tracked object 120. These maximum physical characteristics 1204 are configured for each different use of object tracking system 104 based upon expected movement of tracked object 120. For example, where tracked object 120 is a player in an American football game, maximum physical speed 1206 may be set to 12 m/s, maximum physical acceleration 1208 may be set to 12 m/s$^2$, and maximum physical deceleration 1210 may be set to 30 m/s$^2$. For example, maximum physical characteristics 1204 may be empirically derived from one or more athletes performances in a particular sport, wherein maximum physical characteristics 1204 may be applied to all players in that sport.

In an alternative embodiment, maximum physical characteristics 1204 may be defined for each different position with a sport. For example, in American football, the maximum physical speed of a lineman could be set substantially lower than the maximum physical speed for a wide receiver. This would yield additional filtering and improved noise rejection on the linemen, for example. In yet another embodiment, maximum physical characteristics 1204 may be individually defined for each individual player in a sport, since each player wears a different tag 124. That is, system 104 may handle physical limits of each tracked object 120 independently.

In one embodiment, as shown in FIG. 2, physical limit filter 214 is applied after one or more of averaging filter 202 (e.g., controlled by one or both of period controller 204 and points controller 206), speed based projection filter 210, and multi-tag correction filter 212.

In one example of operation, physical limit filter 214 determines a current speed 1212 of tracked object 120 based upon movement between latest averaged location point 230(1) and previous averaged location point 230(2) and known rate (e.g., 10 hz) of generating averaged location points 230. In one embodiment, physical limit filter 214 uses latest speed 240 as determined external to physical limit filter 214. Physical limit filter 214 determines current acceleration 1216 based upon change between previous speed 1214 and current speed 1212, where previous speed 1214 is remembered from a previous iteration of physical limit filter 214 or is determined from previous averaged location points 230(2) and 230(3).

Where current speed 1212 and/or current acceleration 1216 are greater than maximum physical speed 1206 and maximum physical acceleration 1208, respectively, or where current acceleration 1216 is negative and exceeds maximum physical deceleration 1210, physical limit filter 214 calculates a new location 1230 for averaged location point 230(1) based upon maximum physical characteristics 1204 and previous averaged location points 230(2) and 230(3), and replaces averaged location point 230(1) with new location 1230.

For example, where maximum physical speed 1206 is 12 m/s and averaged location points 230 are generated at a rate of 10 hz, a maximum movement between subsequent averaged location points 230 is 1.2 m. If averaged location point 230(1) indicates a distance of 1.5 m from the location defined by average location point 230(2), physical limit filter 214 recalculates averaged location point 230(1) by assuming that tracked object 120 moves in the same direction as defined by the original averaged location points 230(1) and 230(2), but limits the moved amount to 1.2 m. Similar checks and corrections may be performed for maximum physical acceleration 1208 and maximum physical deceleration 1210 to limit movement between averaged location points 230(1) and 230(2).

Physical limit filter 214 thereby operates to correct an erroneous averaged location point 230 by limiting the movement to physical possibilities; thereby preventing unrealistic movements within averaged location points 230. This reduces the effect of erroneous data to apparent noise of system 104, making the errors far less obtrusive, although still visible, since they are limited to physical possibilities.

Figure 13:
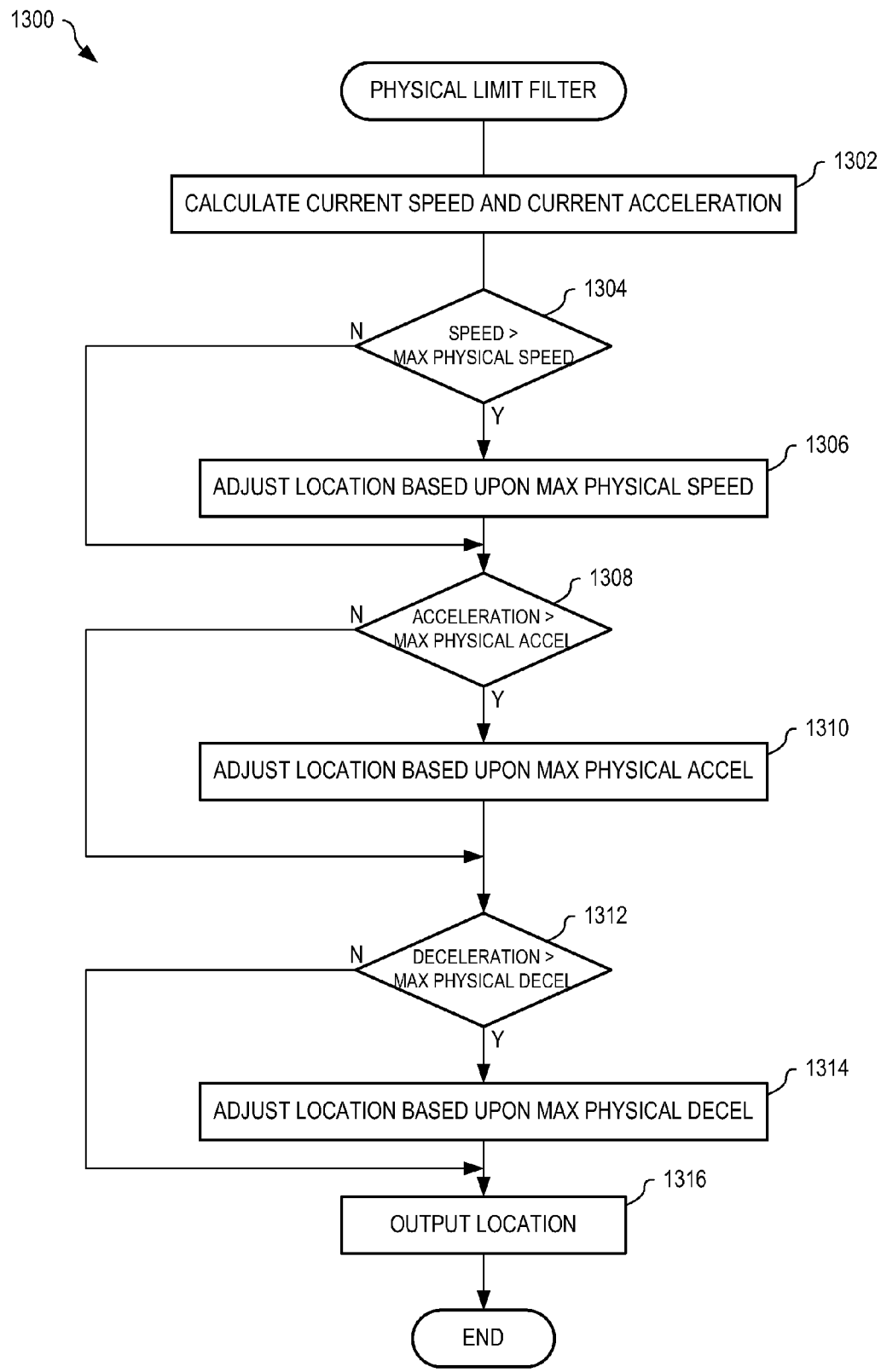
FIG. 13 is a flowchart illustrating one exemplary method for limiting the averaged location points of the tracked object based upon maximum physical characteristics of the tracked object, in an embodiment.

FIG. 13 is a flowchart illustrating one exemplary method 1300 for limiting averaged location points 230 of tracked object 120 based upon maximum physical characteristics 1204 of tracked object 120. Method 1300 is for example implemented within physical limit filter 214 of anti-jitter filter 102 and is invoked for each averaged location point 230 generated and after the averaged location point is processed by other filters (e.g., averaging filter 202, speed based projection filter 210, and multi-tag correction filter 212) and prior to output from anti-jitter filter 102.

In step 1302, method 1300 calculates current speed and current acceleration of the tracked object. In one example of step 1302, physical limit filter 214 determines current speed 1212 and current acceleration 1216 of tracked object 120 based upon distance moved between latest averaged location point 230(1) and previous averaged location point 230(2) and known rate (e.g., 10 hz) of generating averaged location points 230.

Step 1304 is a decision. If, in step 1304, method 1300 determines that current speed 1212 is greater than maximum physical speed 1206, method 1300 continues with step 1306; otherwise method 1300 continues with step 1308.

In step 1306, method 1300 adjusts the location based upon maximum physical speed. In one example of step 1306, physical limit filter 214 calculates new location 1230 for averaged location point 230(1) based upon maximum physical speed 1206 and previous averaged location points 230(2) and 230(3), and replaces averaged location point 230(1) with new location 1230.

Step 1308 is a decision. If, in step 1308, method 1300 determines that current acceleration 1216 is greater than maximum physical acceleration 1208, method 1300 continues with step 1310; otherwise method 1300 continues with step 1312. In step 1310, method 1300 adjusts the location based upon maximum physical acceleration. In one example of step 1310, physical limit filter 214 calculates new location 1230 for averaged location point 230(1) based upon maximum physical acceleration 1208 and previous averaged location points 230(2) and 230(3), and replaces averaged location point 230(1) with new location 1230.

Step 1312 is a decision. If, in step 1312, method 1300 determines that current deceleration is greater than maximum physical deceleration 1210, method 1300 continues with step 1314; otherwise method 1300 continues with step 1316. In step 1314, method 1300 adjusts the location based upon maximum physical deceleration. In one example of step 1314, physical limit filter 214 calculates new location 1230 for averaged location point 230(1) based upon maximum physical deceleration 1210 and previous averaged location points 230(2) and 230(3), and replaces averaged location point 230(1) with new location 1230.

In step 1316, method 1300 outputs the location. In one example of step 1316, physical limit filter 214 outputs average location point 230(1) as improved location data 140.

The Combined Anti-Jitter Filter

The embodiment shown in FIG. 2 depicts speed based projection filter 210, multi-tag correction filter 212, and physical limit filter 214 in a particular order. However, one skilled in the art will appreciate that the scope is not limited to this particular order. For example, where the multi-tag correction filter 212 returns a position as unknown, as described above, the speed based projection filter 210 may be invoked to determine a projected location of the unknown position data point.

Accordingly, each filter 202, 210, 212, and 214 may be used independently, or may be combined to form anti-jitter filter 102. The combination of filters 202, 210, 212, and 214 is most effective in real-world applications.

Averaging filter 202, controlled by speed based period controller 204 may be configured for a modest increase in the period of averaging window 203 wherever the tracked object 120 slows down. This helps where an occasional raw location point 130 has a larger than usual error, due to blockage and/or tilting of tag 124, for example. This filter also provides additional filtering when noise is more perceptible (i.e., when tracked object 120 is stopped or mobbing very slowly).

Averaging filter 202, controlled by speed based points controller 206, helps maintain a uniform level of averaging, and is particularly useful when raw location points 130 are missed (e.g., blocked) for short periods. This filter is only in effect when gaps in raw location points 130 occur; where no gaps occur, this filter is effectively turned off. When a gap does occur, this filter increases the period of averaging window 203 only long enough to get sufficient points for averaging. This filter is particularly helpful when tracked object 120 is stationary (e.g., when an American football players is stationary while leaning over on the line of scrimmage).

Speed based projection filter 210 is particularly effective with slowly moving tracked objects (e.g., slowly moving players in a field game) when medium sized gaps (e.g. 250-1000 ms) occur in raw location points 130.

Multi-tag correction filter 212 corrects for errors introduced when information is blocked from a first of two tags 124 configured with a tracked object (e.g., an athlete).

Physical limit filter 214 provides a "reality check" on improved location data 140 output from anti-jitter filter 102. Determined locations that would violate what is physically possible by the tracked object (e.g., a moving athlete) is dampened down to conform with physical reality.

When all five components are used simultaneously, the perceived quality of the improved location data 140 increases substantially for slowly moving or stopped players, even when raw location points 130 are very erratic.

Anti-Jitter Related Filter Parameters

Where anti-jitter filter 102 includes filters 202, 210, 212, and 214, a common set of parameters may be used to control operation of anti-jitter filter 102. The following summarizes the parameters that control anti-jitter filter 102:

Minimum Period

This is the normal period for averaging filter 202 and should be set as large as possible without introducing either unwanted delay or over-smoothing of the improved location data 140 where movements of tracked object 120 are rounded out (e.g. sharp cuts by a tracked player are rounded out).

Jitter Low Speed Threshold

This parameter defines the speed in m/sec at which anti-jitter filter 102 will begin to turn on. This parameter should be set low enough so that the anti-filter turns on only when the tracked object is almost stopped. The lower this speed setting the better the anti-jitter filter 102 will function; however, it should not be set so low as to never activate because of noise in raw location points 130.

Jitter Low Points Adjust

This parameter should be set to less than or equal to the difference between Desired Points and 1 or set it to 0 if not adjusting Desired Points. This parameter specifies how big each step will be when increasing the filtering by increasing the current Desired Points when the player stops. If, when there is sporadic data and the tacked object stops, the anti-jitter filter 102 doesn't turn on fast enough, then this parameter should be increased. If, when there is sporadic data and the location of tracked objects appear to jump backwards when this filter is activated, the anti-jitter filter 102 is turning on too quickly (or the Low Threshold is too high), so this parameter should be reduced in value.

Jitter Low Period Adjust

This parameter should be set to less than or equal to the difference between Maximum Period and Minimum Period. Low Period Adjust specifies how big each step will be when increasing the filter from Minimum Period to Maximum Period when the speed of the tracked object reduces to below Low Speed Threshold. If the filtering does not turn on fast enough when the tracked object stops, this parameter should be increased in value. If tracked objects appear to jump backwards when the anti-jitter filter is activated, the filter is turning on too quickly (or the Low Speed Threshold is too high), so the Low Period Adjust should be reduced in value. For example if Maximum Period=3000, Minimum Period=500, and Low Period Adjust=500, five raw location points 130 below the Low Threshold are required before the filter is fully activated (e.g., from 500 ms to: 1000, 1500, 2000, 25000, and then 3000 ms). If Low Period Adjust is changed to 1000 then only 3 raw location points 130 below the Low Speed Threshold are required to turn the filter on (e.g., from 500 ms, 1500, 2500, and then 3000 ms). If this parameter is set to the same value as Maximum Period, then the filter will turn on instantly.

Jitter High Speed Threshold

This parameter defines the speed (e.g., in m/s) at which anti-jitter filter 102 starts to turn off. The High Speed Threshold parameter should be set low enough so that the anti-jitter filter begins to turn off as soon as the tracked object begins moving. If this parameter is set too low, sporadic raw location points 130 may cause a stationary tracked object's speed to erroneously start to turn the filter off. The lower the value of this parameter the better; however, the value should not cause the filter to turn off for a stationary tracked object because of noise.

Jitter High Points Adjust

This parameter should be set to a number less than or equal to the difference between Desired Points and 1 or set it to 0 if not adjusting Desired Points. High Points Adjust specifies how big each decrease in the current Desired Points value is when the tracked object starts moving. If filtering does not turn off fast enough, then this value should be increased. If, with sporadic data, the location of the tracked object appears to jump forward when the filter turns off, the filter is turning off too quickly (or the High Speed Threshold is too high), so High Points Adjust value should be increased. For example if Desired Points=10 and High Points Adjust=1, nine samples above the High Threshold are required before the filter is fully turned off (e.g., from 10, 9, 8 . . . 1). If High Period Adjust is increased to 5, then only 2 samples are required to turn off the filter (e.g., from 10, 5, 1). If this parameter is set to 9, then the filter will turn off instantly.

Jitter High Period Adjust

This parameter should be set to a number less than or equal to the difference between Maximum Period and Minimum Period. High Period Adjust specifies the size of each step when reducing the filter from Max Period to Minimum Period after the tracked object increases speed to greater than High Speed Threshold (e.g., when the tracked object is detected as moving again). If the tracked object's location appears to lag behind actual movement, then this parameter should be increased (or the High Speed Threshold should be lowered). If the tracked object appears to jump forward as it begins to move then the filter is turning on too quickly (or the Low Threshold is too high), so the Low Period Adjust parameter should be reduced.

Jitter Desired Points

This parameter controls the desired number of points to average and should be set equal to or close to the number of points you expect to receive from the tag during the Minimum Period under perfect conditions. For a 25 Hz tag and a Minimum Period of 500 ms, that would be 12 (e.g., 500/(1000/25)). With perfect data, system 104 would average 12 points from a 25 Hz tag over a 500 ms period. When data becomes sporadic, this filter expands the Period window back into the past until it has 12 points for averaging.

Jitter Maximum Period

This parameter defines the maximum filter period for averaging filter 202 as controlled by period controller 204 and/or points controller 206.

Maximum Projection Interval

This parameter specifies the maximum allowed raw data gap (e.g., in ms) before the Speed Controlled Projection Filter turns off.

Maximum Physical Speed

This parameter specifies the maximum speed (e.g., in m/s) that the tracked object is physically expected to move at. For example, this speed would be set quite a bit higher if the tracked object is a horse as compared to if the tracked object is a basketball player. The lower the setting, the better the filter identifies and corrects erroneous positions based on unrealistic speeds. However, if it is set too low, the filter will erroneously "correct" positions when the athlete is moving at near their physical speed limit.

Maximum Physical Acceleration

This parameter specifies the maximum acceleration (e.g., in $m/s^2$) that a tracked object is physically expected to move at. The lower the setting, the better the filter identifies and corrects erroneous positions based on unrealistic acceleration. However, if set too low, the filter will erroneously "correct" positions when the athlete is moving at near their physical acceleration limit.

Maximum Physical Deceleration

This parameter specifies the maximum deceleration (e.g., in m/s$^2$) that the tagged athlete is physically expected to move at. For example, this parameter would be set quite a bit higher if the tracked object is an American football player that is the tracked object is a track athlete, because in football, players may sometimes run headlong into each other and thereby incur very high decelerations. The lower the setting, the better the filter will identify and correct erroneous positions based on unrealistic decelerations. However, if It is set it too low, the filter will erroneously "correct" positions when the athlete is moving at near their physical deceleration limit.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. Object tracking anti-jitter filtering method, comprising:
receiving, within an object tracking system, a plurality of raw location points for a tracking tag attached to a tracked object;
storing the plurality of raw location points within a raw location points buffer;
averaging the raw location points within an averaging window to generate a first averaged location point; and
storing the averaged location point within an averaged location points buffer for use within the object tracking system;
wherein a period of the averaging window is based upon most recent speed of the tracked object, and is between a minimum period and a maximum period.

2. The method of claim 1, wherein the averaging window is positioned over most recent stored raw location points of the raw location points buffer.

3. The method of claim 1, wherein, for each generated average location point, the period is increased by a low period adjust value if the latest speed is less than a predefined low speed threshold.

4. The method of claim 1, wherein, for each generated average location point, the period is decreased by a high period adjust value if the latest speed is greater than a predefined high speed threshold.

5. The method of claim 3, further comprising:
determining a desired points value based upon most recent speed, wherein the desired points value is between a minimum points value and a maximum points value; and
if the number of raw location points within the averaging window is less than the desired points value, increasing the period until the number of raw location points included within the averaging window is equal to the desired points value.

6. The method of claim 5, wherein, for each generated average location point, the desired points value is increased by a low points adjust value if the latest speed is less than a predefined low speed threshold.

7. The method of claim 5, wherein, for each generated average location point, the desired points value is decreased by a high points adjust value if the latest speed is greater than a predefined high speed threshold.

8. The method of claim 6, wherein a center of the averaging window is positioned on the raw location points buffer at a fixed delay from most recent raw location point.

9. The method of claim 8, further comprising:
if there are no raw location points within the averaging window and a latest speed of the tracked object is greater than a predefined high speed threshold:
generating a projected location point based upon a determined direction of movement of the tracked object and a determined projection speed of the tracked object, wherein the direction and the projection speed are determined from previous two averaged location points; and
storing the projected location point within the averaged location points buffer.

10. The method of claim 9, further comprising:
if there are no raw location points within the averaging window and a projection interval is greater than a maximum projection interval:
if the projection speed is greater than zero, reducing the projection speed for each subsequently generated projection point;
wherein the projection interval is a cumulative period of consecutively generated projection location points.

11. The method of claim 10, further comprising:
determining, from averaged location points determined for the tracking tag and for at least one additional tracking tag attached to the tracked object, an object location of the tracked object based upon positions of the tracking tags relative to one another and relative to the tracked object; and
if one of the averaged location points is missing, correcting the object location based upon an orientation of the tracked object and a distance between the tracking tag associated with the missing average location point and an average position of all tracking tags;
wherein the orientation is determined from at least one average location point from each of two different tracking tags.

12. The method of claim 11, further comprising:
determining a current acceleration of the tracked object based upon three most recently determined average location points; and
if one or more of the latest speed and the current acceleration are greater than maximum physical characteristics of the tracked object, correcting the most recent average location point based upon the maximum physical characteristics.

13. Object tracking anti-jitter filtering system, comprising:
at least one processor;
memory coupled with the processor for storing raw location points of a tracked object;
an averaging filter, comprising machine readable instructions stored within the memory and executed by the processor, for averaging a plurality of the raw location points within an averaging window to generate an averaged location point having reduced jitter when compared to raw location points of the tracked object; and,
a speed based period controller, comprising machine readable instructions stored within the memory and executed by the processor, for incrementally increasing a period of the averaging window when a latest speed of the tracked object is less than a predefined low speed threshold, and for decreasing the period when the latest speed is greater than a predefined high speed threshold.

14. The system of claim 13, further comprising:
a speed based point controller, comprising machine readable instructions stored within the memory and executed by the processor, for incrementally increasing a desired points value that defines the number of raw location points to average when a latest speed of the tracked object is less than the low speed threshold and for incrementally decreasing the desired points value when the latest speed is greater than the high speed threshold.

15. The system of claim 14, further comprising:
a speed based projection filter, comprising machine readable instructions stored within the memory and executed by the processor, for generating the averaged location point based upon at least two previously generated average location points for the tracking tag using a projection technique when a latest speed of the tracked object is greater than a predefined high speed threshold and the averaging window contains not received raw location points.

16. The system of claim 15, wherein the projection technique comprises at least one projection technique chosen from the group consisting of: weighted averaging, linear interpolation, piecewise interpolation, polynomial interpolation, and curve fitting.

17. The system of claim 16, further comprising:
a multi-tag correction filter, comprising machine readable instructions stored within the memory and executed by the processor, for correcting an object location, determined by averaging the location of a plurality of tracking tags attached to the tracked object, towards the location of one tracking tag for which averaged location points are missing.

18. The system of claim 17, further comprising:
a physical limit filter, comprising machine readable instructions stored within the memory and executed by the processor, for adjusting the averaged location point when one or both of a latest speed of the tracked object and an acceleration of the tracked object exceeds maximum physical characteristics of the tracked object;
wherein the averaged location point is set to a location, relative to a previous averaged location point, that is within the maximum physical characteristics.

* * * * *

UNITED STATES PATENT AND TRADEMARK OFFICE
CERTIFICATE OF CORRECTION

PATENT NO. : 9,081,076 B2
APPLICATION NO. : 13/674747
DATED : July 14, 2015
INVENTOR(S) : Douglas J. DeAngelis et al.

Page 1 of 1

It is certified that error appears in the above-identified patent and that said Letters Patent is hereby corrected as shown below:

In The Specification
Column 3, line 31, "the affects of varying filter delay" should read -- the effects of varying filter delay --;
Column 4, line 48, "an speed based projection filter" should read -- a speed based projection filter --;
Column 4, line 48 and 49, "an multi-tag correction" should read -- a multi-tag correction --;
Column 6, line 34, "for tacked object 120" should read -- for tracked object 120 --;
Column 9, line 20, "for tacked object 120" should read -- for tracked object 120 --;
Column 10, line 3 and 4, "points value 520 reaches maximum points 506" should read -- points value 520 reached maximum points 506 --;
Column 10, line 18, "operation of tacking tag" should read -- operation of tracking tag --;
Column 12, line 39, "does not presents" should read -- does not present --;
Column 13, line 2, "the affects of varying filter delay" should read -- the effects of varying filter delay --.

Signed and Sealed this
Twenty-second Day of March, 2016

Michelle K. Lee
*Director of the United States Patent and Trademark Office*